United States Patent
Bharadwaj et al.

(10) Patent No.: US 11,032,780 B2
(45) Date of Patent: Jun. 8, 2021

(54) POWER CONTROL IN WIRELESS NETWORKS

(71) Applicant: QUALCOMM Incorporated, San Diego, CA (US)

(72) Inventors: Arjun Bharadwaj, Poway, CA (US); Rahul Tandra, San Diego, CA (US); Bin Tian, San Diego, CA (US); Youhan Kim, San Jose, CA (US); Simone Merlin, San Diego, CA (US); George Cherian, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 36 days.

(21) Appl. No.: 15/253,651

(22) Filed: Aug. 31, 2016

(65) Prior Publication Data
US 2017/0070961 A1    Mar. 9, 2017

Related U.S. Application Data

(60) Provisional application No. 62/214,159, filed on Sep. 3, 2015.

(51) Int. Cl.
*H04W 52/24* (2009.01)
*H04W 52/14* (2009.01)
(Continued)

(52) U.S. Cl.
CPC ........ *H04W 52/242* (2013.01); *H04B 7/0452* (2013.01); *H04L 1/0009* (2013.01); *H04L 5/0053* (2013.01); *H04L 27/2601* (2013.01); *H04W 52/143* (2013.01); *H04W 52/146* (2013.01); *H04W 52/228* (2013.01);
(Continued)

(58) Field of Classification Search
CPC . H04B 7/0452; H04L 1/0009; H04L 27/2601; H04L 5/0053; H04W 52/143
See application file for complete search history.

(56) References Cited

U.S. PATENT DOCUMENTS

| 8,937,874 B2 | 1/2015 | Gainey et al. |
| 9,037,180 B2 | 5/2015 | Sridhara et al. |

(Continued)

FOREIGN PATENT DOCUMENTS

| CN | 104284408 A | 1/2015 |
| JP | 2014027412 A | 2/2014 |

(Continued)

OTHER PUBLICATIONS

International Search Report and Written Opinion—PCT/US2016/049910—ISA/EPO—dated Nov. 18, 2016.

*Primary Examiner* — Khaled M Kassim
(74) *Attorney, Agent, or Firm* — Kevin M. Donnelly; Arent Fox, LLP

(57) ABSTRACT

A method, an apparatus, and a computer-readable medium for wireless communication are provided. In one aspect, the apparatus is configured to determine a target receiver power level for uplink transmissions received at the apparatus, to determine uplink power control information based on the determined target receiver power level for UL MU-MIMO transmission or UL OFDMA transmission, and to transmit a frame that includes the determined uplink power control information to a station scheduled by the apparatus for uplink transmission.

20 Claims, 15 Drawing Sheets

(51) Int. Cl.
  *H04L 27/26* (2006.01)
  *H04B 7/0452* (2017.01)
  *H04L 1/00* (2006.01)
  *H04W 52/22* (2009.01)
  *H04L 5/00* (2006.01)
  *H04W 52/36* (2009.01)
  *H04W 52/26* (2009.01)

(52) U.S. Cl.
  CPC ........ *H04W 52/262* (2013.01); *H04W 52/265* (2013.01); *H04W 52/362* (2013.01); *H04W 52/367* (2013.01)

(56) References Cited

U.S. PATENT DOCUMENTS

| | | | |
|---|---|---|---|
| 2005/0084029 A1* | 4/2005 | Lim | H04B 7/0634 375/267 |
| 2006/0223445 A1* | 10/2006 | Baker | H04W 52/262 455/69 |
| 2006/0253736 A1* | 11/2006 | Rudolf | H04W 72/0473 714/12 |
| 2007/0230375 A1* | 10/2007 | Yomo | H04W 52/24 370/280 |
| 2008/0207150 A1* | 8/2008 | Malladi | H04W 52/08 455/127.1 |
| 2010/0208603 A1* | 8/2010 | Ishii | H04B 1/7113 370/252 |
| 2011/0098076 A1* | 4/2011 | Kim | H04W 52/12 455/522 |
| 2011/0103290 A1* | 5/2011 | Suzuki | H04L 5/0023 370/312 |
| 2011/0243278 A1* | 10/2011 | Cheng | H03M 13/136 375/340 |
| 2011/0250918 A1* | 10/2011 | Jen | H04W 52/08 455/509 |
| 2011/0261707 A1 | 10/2011 | Chin et al. | |
| 2012/0106477 A1* | 5/2012 | Kwon | H04W 52/365 370/329 |
| 2012/0176915 A1* | 7/2012 | Lee | H04W 52/241 370/248 |
| 2012/0213092 A1* | 8/2012 | Sun | H04W 52/244 370/248 |
| 2013/0324181 A1* | 12/2013 | Aio | H04W 52/04 455/522 |
| 2014/0169321 A1* | 6/2014 | Imamura | H04W 52/146 370/329 |
| 2014/0177467 A1* | 6/2014 | Kim | H04W 52/242 370/252 |
| 2014/0226551 A1* | 8/2014 | Ouchi | H04W 52/04 370/311 |
| 2014/0247796 A1* | 9/2014 | Ouchi | H04L 5/0053 370/329 |
| 2014/0293953 A1* | 10/2014 | Seo | H04W 24/10 370/329 |
| 2015/0043437 A1* | 2/2015 | Chakraborty | H04W 52/243 370/329 |
| 2015/0049690 A1* | 2/2015 | Sambhwani | H04L 5/0053 370/329 |
| 2015/0055497 A1* | 2/2015 | Cheng | H04W 52/262 370/252 |
| 2015/0173024 A1* | 6/2015 | Seo | H04W 52/146 370/329 |
| 2015/0271790 A1* | 9/2015 | Lee | H04W 48/16 455/450 |
| 2015/0319700 A1* | 11/2015 | Oteri | H04W 24/10 455/127.1 |
| 2016/0100370 A1* | 4/2016 | Rong | H04W 52/06 455/522 |
| 2016/0119881 A1* | 4/2016 | Merlin | H04W 52/146 370/328 |
| 2016/0119883 A1* | 4/2016 | Lee | H04W 52/365 370/329 |
| 2016/0219529 A1* | 7/2016 | Benjebbour | H04W 52/14 |
| 2016/0227489 A1* | 8/2016 | Oteri | H04W 74/0808 |
| 2016/0302185 A1* | 10/2016 | Sun | H04W 74/08 |
| 2017/0019863 A1* | 1/2017 | Cariou | H04W 52/283 |
| 2017/0055229 A1* | 2/2017 | Klockar | H04W 52/146 |
| 2017/0181102 A1* | 6/2017 | Bharadwaj | H04W 52/146 |
| 2017/0201995 A1* | 7/2017 | Rong | H04B 17/318 |

FOREIGN PATENT DOCUMENTS

| | | |
|---|---|---|
| WO | 2012158229 A1 | 11/2012 |
| WO | 2013044074 A1 | 3/2013 |
| WO | 2015000304 A1 | 1/2015 |

* cited by examiner

POWER CONTROL IN WIRELESS NETWORKS

CROSS-REFERENCE TO RELATED APPLICATION(S)

This application claims the benefit of U.S. Provisional Application Ser. No. 62/214,159, entitled "POWER CONTROL IN WIRELESS NETWORKS" and filed on Sep. 3, 2015, which is expressly incorporated by reference herein in its entirety.

BACKGROUND

Field

The present disclosure relates generally to communication systems, and more particularly, to power control regulation in uplink transmissions.

Background

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, Synchronous Optical Networking (SONET), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc., frequency bands. Wireless networks advantageously facilitate user mobility and rapid field deployment when compared to fixed wired networks.

SUMMARY

The systems, methods, computer-readable media, and devices of the invention each have several aspects, no single one of which is solely responsible for the invention's desirable attributes. Without limiting the scope of this invention as expressed by the claims which follow, some features will now be discussed briefly. After considering this discussion, and particularly after reading the section entitled "Detailed Description," one will understand how the features of this invention provide advantages for devices in a wireless network.

One aspect of this disclosure provides an apparatus (e.g., an access point) for wireless communication. The apparatus may be configured to determine a target receiver power level for uplink transmissions received at the apparatus, to determine uplink power control information based on the determined target receiver power level for uplink multi-user multiple-input-multiple-output (UL MU-MIMO) transmission or uplink orthogonal frequency-division multiple access (UL OFDMA) transmission, and to transmit a frame that includes the determined uplink power control information to a station scheduled by the apparatus for uplink transmission.

Another aspect of this disclosure provides an apparatus (e.g., a station) for wireless communication. The apparatus may be configured to receive a frame from an access point. The frame may include uplink power control information, associated with a target receiver power level at the access point, for UL MU-MIMO transmission or UL OFDMA transmission. The apparatus may be configured to determine a transmit power based on the received uplink power control information and to transmit a second frame to the access point based on the determined transmit power.

DETAILED DESCRIPTION

Figure 1:
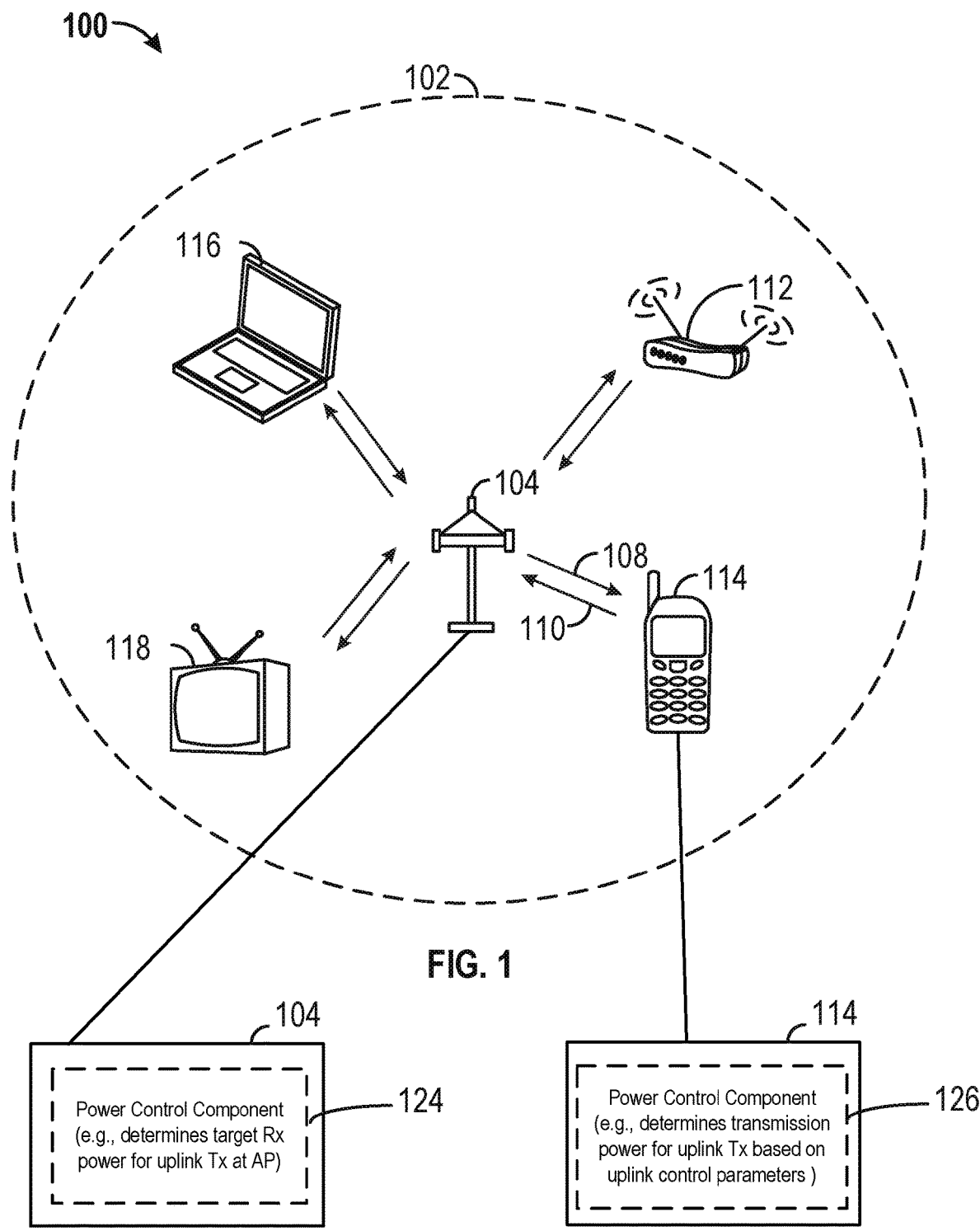
FIG. 1 shows an example wireless communication system in which aspects of the present disclosure may be employed.

Various aspects of the novel systems, apparatuses, computer-readable media, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, computer program products, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wireless network technologies may include various types of wireless local area networks (WLANs). A WLAN may be used to interconnect nearby devices together, employing widely used networking protocols. The various aspects described herein may apply to any communication standard, such as a wireless protocol.

In some aspects, wireless signals may be transmitted according to an 802.11 protocol using orthogonal frequency-division multiplexing (OFDM), direct-sequence spread spectrum (DSSS) communications, a combination of OFDM and DSSS communications, or other schemes. Implementations of the 802.11 protocol may be used for sensors, metering, and smart grid networks. Advantageously, aspects of certain devices implementing the 802.11 protocol may consume less power than devices implementing other wireless protocols, and/or may be used to transmit wireless signals across a relatively long range, for example about one kilometer or longer.

In some implementations, a WLAN includes various devices which are the components that access the wireless network. For example, there may be two types of devices: access points (APs) and clients (also referred to as stations or "STAs"). In general, an AP may serve as a hub or base station for the WLAN and a STA serves as a user of the WLAN. For example, a STA may be a laptop computer, a personal digital assistant (PDA), a mobile phone, etc. In an example, a STA connects to an AP via a Wi-Fi (e.g., IEEE 802.11 protocol) compliant wireless link to obtain general connectivity to the Internet or to other wide area networks. In some implementations a STA may also be used as an AP.

An access point may also comprise, be implemented as, or known as a NodeB, Radio Network Controller (RNC), eNodeB, Base Station Controller (BSC), Base Transceiver Station (BTS), Base Station (BS), Transceiver Function (TF), Radio Router, Radio Transceiver, connection point, or some other terminology.

A station may also comprise, be implemented as, or known as an access terminal (AT), a subscriber station, a subscriber unit, a mobile station, a remote station, a remote terminal, a user terminal, a user agent, a user device, a user equipment, or some other terminology. In some implementations, a station may comprise a cellular telephone, a cordless telephone, a Session Initiation Protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

The term "associate," or "association," or any variant thereof should be given the broadest meaning possible within the context of the present disclosure. By way of example, when a first apparatus associates with a second apparatus, it should be understood that the two apparatuses may be directly associated or intermediate apparatuses may be present. For purposes of brevity, the process for establishing an association between two apparatuses will be described using a handshake protocol that requires an "association request" by one of the apparatus followed by an "association response" by the other apparatus. It will be understood by those skilled in the art that the handshake protocol may require other signaling, such as by way of example, signaling to provide authentication.

Any reference to an element herein using a designation such as "first," "second," and so forth does not generally limit the quantity or order of those elements. Rather, these designations are used herein as a convenient method of distinguishing between two or more elements or instances of an element. Thus, a reference to first and second elements does not mean that only two elements can be employed, or that the first element must precede the second element. In addition, a phrase referring to "at least one of" a list of items refers to any combination of those items, including single members. As an example, "at least one of: A, B, or C" is intended to cover: A, or B, or C, or any combination thereof (e.g., A-B, A-C, B-C, and A-B-C).

As discussed above, certain devices described herein may implement the 802.11 standard, for example. Such devices, whether used as a STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g. for use with hotspots), or to implement machine-to-machine communications.

FIG. 1 shows an example wireless communication system 100 in which aspects of the present disclosure may be employed. The wireless communication system 100 may operate pursuant to a wireless standard, for example the 802.11 standard. The wireless communication system 100 may include an AP 104, which communicates with STAs (e.g., STAs 112, 114, 116, and 118).

A variety of processes and methods may be used for transmissions in the wireless communication system 100 between the AP 104 and the STAs. For example, signals may be sent and received between the AP 104 and the STAs in accordance with OFDM/OFDMA techniques. If this is the case, the wireless communication system 100 may be referred to as an OFDM/OFDMA system. Alternatively, signals may be sent and received between the AP 104 and the STAs in accordance with CDMA techniques. If this is the case, the wireless communication system 100 may be referred to as a CDMA system.

A communication link that facilitates transmission from the AP 104 to one or more of the STAs may be referred to as a downlink (DL) 108, and a communication link that facilitates transmission from one or more of the STAs to the AP 104 may be referred to as an uplink (UL) 110. Alternatively, a downlink 108 may be referred to as a forward link or a forward channel, and an uplink 110 may be referred to as a reverse link or a reverse channel. In some aspects, DL communications may include unicast or multicast traffic indications.

The AP 104 may suppress adjacent channel interference (ACI) in some aspects so that the AP 104 may receive UL communications on more than one channel simultaneously without causing significant analog-to-digital conversion (ADC) clipping noise. The AP 104 may improve suppression of ACI, for example, by having separate finite impulse response (FIR) filters for each channel or having a longer ADC backoff period with increased bit widths.

The AP 104 may act as a base station and provide wireless communication coverage in a basic service area (BSA) 102. A BSA (e.g., the BSA 102) is the coverage area of an AP (e.g., the AP 104). The AP 104 along with the STAs associated with the AP 104 and that use the AP 104 for communication may be referred to as a basic service set (BSS). It should be noted that the wireless communication system 100 may not have a central AP (e.g., AP 104), but rather may function as a peer-to-peer network between the STAs. Accordingly, the functions of the AP 104 described herein may alternatively be performed by one or more of the STAs.

The AP 104 may transmit on one or more channels (e.g., multiple narrowband channels, each channel including a frequency bandwidth) a beacon signal (or simply a "beacon"), via a communication link such as the downlink 108, to other nodes (STAs) of the wireless communication system 100, which may help the other nodes (STAs) to synchronize their timing with the AP 104, or which may provide other information or functionality. Such beacons may be transmitted periodically. In one aspect, the period between successive transmissions may be referred to as a superframe. Transmission of a beacon may be divided into a number of groups or intervals. In one aspect, the beacon may include, but is not limited to, such information as timestamp information to set a common clock, a peer-to-peer network identifier, a device identifier, capability information, a superframe duration, transmission direction information, reception direction information, a neighbor list, and/or an extended neighbor list, some of which are described in additional detail below. Thus, a beacon may include information that is both common (e.g., shared) amongst several devices and specific to a given device.

In some aspects, a STA (e.g., STA 114) may be required to associate with the AP 104 in order to send communications to and/or to receive communications from the AP 104. In one aspect, information for associating is included in a beacon broadcast by the AP 104. To receive such a beacon, the STA 114 may, for example, perform a broad coverage search over a coverage region. A search may also be performed by the STA 114 by sweeping a coverage region in a lighthouse fashion, for example. After receiving the information for associating, the STA 114 may transmit a reference signal, such as an association probe or request, to the AP 104. In some aspects, the AP 104 may use backhaul services, for example, to communicate with a larger network, such as the Internet or a public switched telephone network (PSTN).

In an aspect, the AP 104 may include one or more components for performing various functions. For example, the AP 104 may include a power control component 124 to perform procedures related to uplink power control. In this example, the power control component 124 may be configured to determine a target receiver power level for uplink transmissions received at the AP 104. The power control component 124 may be configured to determine uplink power control information based on the determined target receiver power level for UL MU-MIMO transmission or UL OFDMA transmission. The power control component 124 may be configured to transmit a frame that includes the determined uplink power control information to a station (e.g., the STA 114) scheduled by the AP 104 for uplink transmission.

In another aspect, the STA 114 may include one or more components for performing various functions. For example, the STA 114 may include a power control component 126 to perform procedures related to uplink power control. In this example, the power control component 126 may be configured to receive a frame from the AP 104. The frame may include uplink power control information, associated with a target receiver power level at the AP 104, for UL MU-MIMO transmission or UL OFDMA transmission. The power control component 126 may be configured to determine a transmit power based on the received uplink power control information. The power control component 126 may be configured to transmit a second frame to the AP 104 based on the determined transmit power.

In wireless networks, transmission power control is generally required for uplink multi-user transmissions. For example, in networks that support OFDMA and MU-MIMO, some form of transmission power control may be required. In OFDMA, power control may be used to manage interference between different resource units (RUs) by controlling power imbalance between STAs scheduled in adjacent RUs. An RU may be, for example, a subset of tones within a symbol. An RU may have 26 tones, 52 tones, 106 tones, 242 tones, 484 tones, 996 tones, 2×996 tones, or some other number of tones. The number of tones in an RU may correspond to the size of the RU.

Transmission power control may also be used to meet power spectral density (PSD) requirements and mitigate leakage. In MU-MIMO, transmission power control may be used to manage inter-stream (e.g., multiple spatial streams) interference by controlling power imbalance between STAs scheduled for transmission. For example, in MU-MIMO, all STAs or a group of STAs may be scheduled for or allocated on the same RU, and therefore, transmit on the same frequency but on different spatial streams. As such, transmission power control may help reduce power imbalance among the STAs.

In an aspect, uplink MU-MIMO transmission may require strict power control. Power imbalance among scheduled STAs may need to be within certain power limits. For example, assuming STAs are transmitting with a modulation and coding scheme (MCS) index of 7, power imbalance may be required to be within 6 dB to avoid impact to performance. Power imbalance requirements limits may by more stringent (e.g., lower) for higher MCS indices, and uplink MU-MIMO may use higher MCS values.

OFDMA transmission may be able to tolerate larger power imbalances among users. For example, OFDMA transmissions may be able to tolerate up to a 20 dB imbalance at an MCS index of 7. As such, a transmission power control mechanism that is suitable for uplink MU-MIMO transmission may also be suitable for uplink OFDMA transmissions. Therefore, the discussion regarding power control for MU-MIMO transmissions is also applicable to OFDMA transmissions.

In another aspect, an AP may determine the MCS and transmission duration of the uplink MU-MIMO transmission. The AP may know the required signal to noise ratio (SNR) or signal-to-interference noise ratio (SINR) at the AP for each user. The AP may also know the respective pathloss for each user. As such, a STA may not be able to modify the signaled MCS values. In an aspect, pre-forward error code (FEC) padding may ensure that the entire uplink packet duration is decoded by the AP.

To enable power control in wireless networks (e.g., a Wi-Fi network according to the IEEE 802.11 standard), two types of power control, referred to as open loop and closed loop, are provided. In open loop power control, an AP does not issue explicit power control commands to the scheduled STAs. Instead, each STA may autonomously determine a respective transmit power to use. The STA may determine the transmit power based on an estimated pathloss between the AP and the STA, a signaled MCS from the AP, and/or other factors. The other factors may include a number of users scheduled in the same RU and the MCSs associated with each of the users and/or AP receiver capability. AP receiver capability may refer to the SNR or SINR needed for different MCS levels supported by the AP. The AP receiver capability, and other information may be exchanged during the association phase between an AP and a STA.

In closed loop power control, the AP may issue explicit power control commands to one or more STAs. Upon receiving the explicit power control commands, each STA may adjust its transmit power based on the power control commands. As will be discussed later, explicit power control commands need not include an express transmit power for the STA. Alternatively, the AP may indicate a power control command by indicating a target received signal strength indicator (RSSI) or a target receiver (Rx) power level with respect to signals to be received at the AP from the STA, and the STA may determine, based on the target RSSI/Rx power level, a transmit power sufficient to satisfy the target RSSI/Rx power level.

The AP may determine a target Rx power level (or a target RSSI) based on a number of factors. The target Rx power level may be based on a number of MU-MIMO users scheduled in an RU allocation. For example, when the number of MU-MIMO users (or OFDMA users) increases, the required target Rx power level may increase. By contrast, when the number of MU-MIMO users decreases, the required target Rx power level may correspondingly decrease. The target Rx power level may be based on an MCS value. A higher MCS value may require a higher target Rx power level. Further, for the same MCS, the required Rx power level may increase with the number of users. For example, at an MCS index of 7, the required SNR may increase by approximately 3-4 dB if one additional user is added. STAs may not be aware of the number of MU-MIMO users scheduled, and therefore, STAs may not be aware of the transmit power imbalance among scheduled STAs. Also, one STA may not know the pathloss of another STA.

In an aspect, desired SNR targets for various MCSs and packet durations may be based on AP implementation. An AP may explicitly indicate the MCS and the packet duration through a trigger message transmitted from the AP to the STA. STAs may not be aware of the Rx power requirements at the AP for the indicated MCS and packet durations. Also, inter-stream interference management capabilities at the AP may be implementation dependent (e.g., varying from AP to AP). A required SNR associated with an MCS and the number of users may vary for different AP implementations.

By using closed loop power control, a STA need not be aware of the complexity of different AP implementations. In closed loop power control, STAs may not be able to autonomously adjust the transmitter (Tx) power level accurately without having sufficient information discussed above. Inaccurate Tx power level may affect the performance of all scheduled STAs due to inter-stream interference.

For a closed loop type of power control, the AP may need to know the power control capabilities of each STA in order to provide effective power control commands. For example, the AP may need to know the power control range (e.g., minimum and maximum transmit power) for each STA. The power control range may refer to the amount of transmit power level change that can be applied at the STA. In an aspect, the maximum amount of transmit power level change may be determined by a difference between the maximum transmit power and the minimum transmit power. The AP may need to know the limits of a STA's transmit power levels, which may be based on each STA's implementation and the type of power amplification at each STA. In an aspect, the STA may have a different maximum transmit power level for each MCS and/or RU size. The AP may want to designate different maximum transmit power levels for each MCS and for each allocated RU.

In an aspect, power control capabilities may be negotiated between a STA and an AP or defined in a future Wi-Fi specification or standard (e.g., IEEE 802.11ax). In some instances, negotiating all power control capabilities during association or another phase may be overly complex. The AP may need to store or keep track of each STA's individual capabilities and issue appropriate power control commands. Specifying too many power control commands, however, may impact implementation flexibility, and STAs may want to be able to make appropriate implementation choices based on cost and/or market conditions. As an alternative, a limited number of power control capabilities may be specified in a future standard, for example, which could reduce implementation flexibility and reduce complexity. For example, one or more power control capabilities may be specified. In this alternative, STAs may be allowed to make appropriate implementation choices based on cost/market conditions, for example. As such, a combination of capability exchange and standard specified capabilities may be beneficial. Table 1 below illustrates an example of hardware requirements that may be specified in a standard.

TABLE 1

Example Hardware Requirements

| Parameter | Minimum Requirements |
|---|---|
| Dynamic Range | 40 dB (e.g., −20 dB to 20 dB) or 30 dB |
| Absolute Tx Power Accuracy | ±9 dB or +/−3 dB for high capability devices |
| Relative Tx Power Accuracy | ±3 dB (ΔP > ±3 dB) |
| Tx Power Step Size | 1 dB |
| Absolute RSSI measurement accuracy | ±3 dB |
| Relative RSSI measurement accuracy | ±1.5 dB |

By way of example, Table 1 illustrates a set of parameters and minimum requirement values associated with each parameter that may be defined in a future Wi-Fi standard. The parameters and values are exemplary, and other parameters and values may be used. Referring to Table 1, the dynamic range refers to the difference between the minimum and maximum possible transmit powers supported by a STA. The dynamic range may be MCS and/or bandwidth (RU size dependent, and RU sizes may be denoted by the number of available tones in the RU such as 26 tones, 52 tones, etc.). By standardizing a dynamic range across all STAs, a transmit power control range may be specified. Not having a dynamic range requirement may lead to users with very low transmit power control range, which may reduce flexibility from an uplink MU point of view. In Table 1, the dynamic range may be 40 dB (based on a minimum transmit power of −20 dB and a maximum transmit power of 20 dB). Other values for the dynamic range may also be appropriate. The dynamic range may also be standardized by specifying a minimum Tx power (for e.g., −10 dB) and a maximum Tx power (for e.g., 30 dB) that all devices should follow. The absolute Tx power accuracy may refer to the accuracy of a Tx power level when a STA determines the Tx power level. In a closed loop power control setting, the STA may determine a Tx power level based on an express Tx power level indicated by the AP (e.g., −10 dB). Alternatively, in the closed loop power control setting, the AP may indicate a target Rx power level or target RSSI, and the STA may determine a Tx power level based on the target RSSI or the target Rx power level by computing the pathloss between the AP and the STA. For example, Table 1 indicates that the absolute transmit power accuracy may be ±9 dB or +/−3 dB for high capability devices. As such, if the STA determines to transmit at −10 dB, then the actual power for the transmission may range from −19 dB to −1 dB. The relative transmit power accuracy refers to the accuracy when a change in transmit power is requested from a previous transmission. That is, transmit power may change from one packet to another packet. In an aspect, a STA may more easily meet a relative power accuracy requirement than an absolute transmit power accuracy requirement. As such, the relative transmit power accuracy requirement may be smaller than the absolute transmit power accuracy requirement. Referring to Table 1, the relative transmit power accuracy may be ±3 dB or even lower. Using this example, an AP may have previously indicated an express transmit power level (or a target RSSI). Assuming the requested transmit power level was −10 dB for a previous packet, the AP may request an increased transmit power level of −5 dB if the previous packet was not received or received with error. Based on the relative transmit power accuracy of ±3 dB, the STA may transmit the next packet at a power level between the range of −8 dB to −2 dB. Also, instead of specifying an actual transmit power level, the AP may specify a target RSSI, and the STA may calculate a new transmit power level based on the newly received target RSSI. The STA may transmit the next packet at the new transmit power level based on the newly received target RSSI, and the actual transmit power level may be within ±3 dB of the intended transmit power level. Referring again to Table 1, the Tx power step size may refer to the minimum granularity with which the Tx power may be adjusted. By way of example in Table 1, the transmit power may be adjusted in increments of 1 dB. Alternatively, the transmit power may be adjusted in increments of 2 dB or some other value. Because errors in transmit power level may impact power control performance, standardizing the various requirements as shown in Table 1 may enable reasonable accuracy of absolute and relative power levels. Absolute RSSI measurement accuracy refers to the STA or AP's accuracy in measuring the RSSI. Relative RSSI measurement accuracy may refer to the accuracy with which the STA or AP is able to measure a change in RSSI.

Not all power control parameter values, however, need to be standardized. Certain information related to power control capabilities may be exchanged between the AP and the STA. In an aspect, the information may include the maximum and/or minimum transmit power levels associated with each MCS for the STA and/or the AP. Different STAs may have different maximum and/or minimum transmit power levels associated with each MCS supported by the STA based on the power amplifier implementation within each STA and the backoff values from the maximum transmit power level applied for each MCS. In an aspect, instead of exchanging a maximum transmit power level for each MCS, a STA may indicate a backoff value for each MCS and an overall maximum transmit power level for the STA. The AP may determine the maximum transmit power level for each MCS based on the difference between the overall maximum transmit power level and the backoff value for each of the MCS values. For example, if the maximum transmit power is 20 dB, and the backoff value for MCS index 7 is 5 dB, then the maximum transmit power for MCS index 7 is 15 dB. In another aspect, the transmit power level may also vary based on the size of each RU (e.g., 26-tone RU, 52-tone RU, etc.). Different RU sizes may be associated with a different amount of interference, which may require different transmit power levels. Alternatively, instead of determining a STA's capabilities based on exchanging information during association, the AP may determine a STA's capabilities based on a history of communication with the STA. For example, based on previous communications with the STA, the AP may determine which transmit power levels and corresponding MCSs result in successful reception of data. Based on trial and error, the AP may store a set of power control parameters for each STA. Also, in addition to the maximum and minimum transmit power levels for each MCS and/or for each RU, additional capabilities may be exchanged based on different power control mechanisms. For example, the STA need not exchange a complete set of transmit power levels (e.g., for all MCS values from 0-10 and all RU sizes), but may exchange a subset (e.g., for MCS values from 2-7 and RU size of 26 tones and 52 tones) of the information based on the requirements of the power control mechanism. In another aspect, a subset or all of the transmit power control parameters of the STA may be implicitly indicated via an indication of a class of the STA. Certain classes of STA may be associated with certain transmit power control parameters, for example.

In another aspect, assuming a closed loop type of power control in which the AP provides power control commands, different power control strategies may be adopted. In a first option, a joint power control strategy may be adopted in which the AP issues the same power control command for all STA scheduled for transmission. The joint power control strategy provides simplicity and enables all STAs to follow a single power control command appropriate for all STAs. In a second option, an individual power control strategy may be adopted. Under an individual power control strategy, power control commands may be issued separately for each STA scheduled for transmission. Each scheduled STA may decode and apply a specific power control command. In a third option, a combination of joint and individual power control may be utilized. Scheduled STAs may be divided into sub-groups and power control commands may be issued for each sub-group separately. STAs belonging to a sub-group may follow the corresponding power control command associated with the sub-group.

An AP's Rx power level requirements may be different for each scheduled STA. Each STA scheduled for transmission may have a different pathloss to the AP and have different MCS capabilities. Finding power control commands suitable for STAs with the different pathloss and different MCS capabilities may be difficult and may reduce the opportunities to use MU-MIMO. As such, individual power control may offer greater flexibility to the AP. Furthermore, the individual power control option may still enable the AP to issue the same power control command to more than one STA, which would mimic the joint or combined options discussed above without the complexities associated with the joint and combined options.

Figure 2:
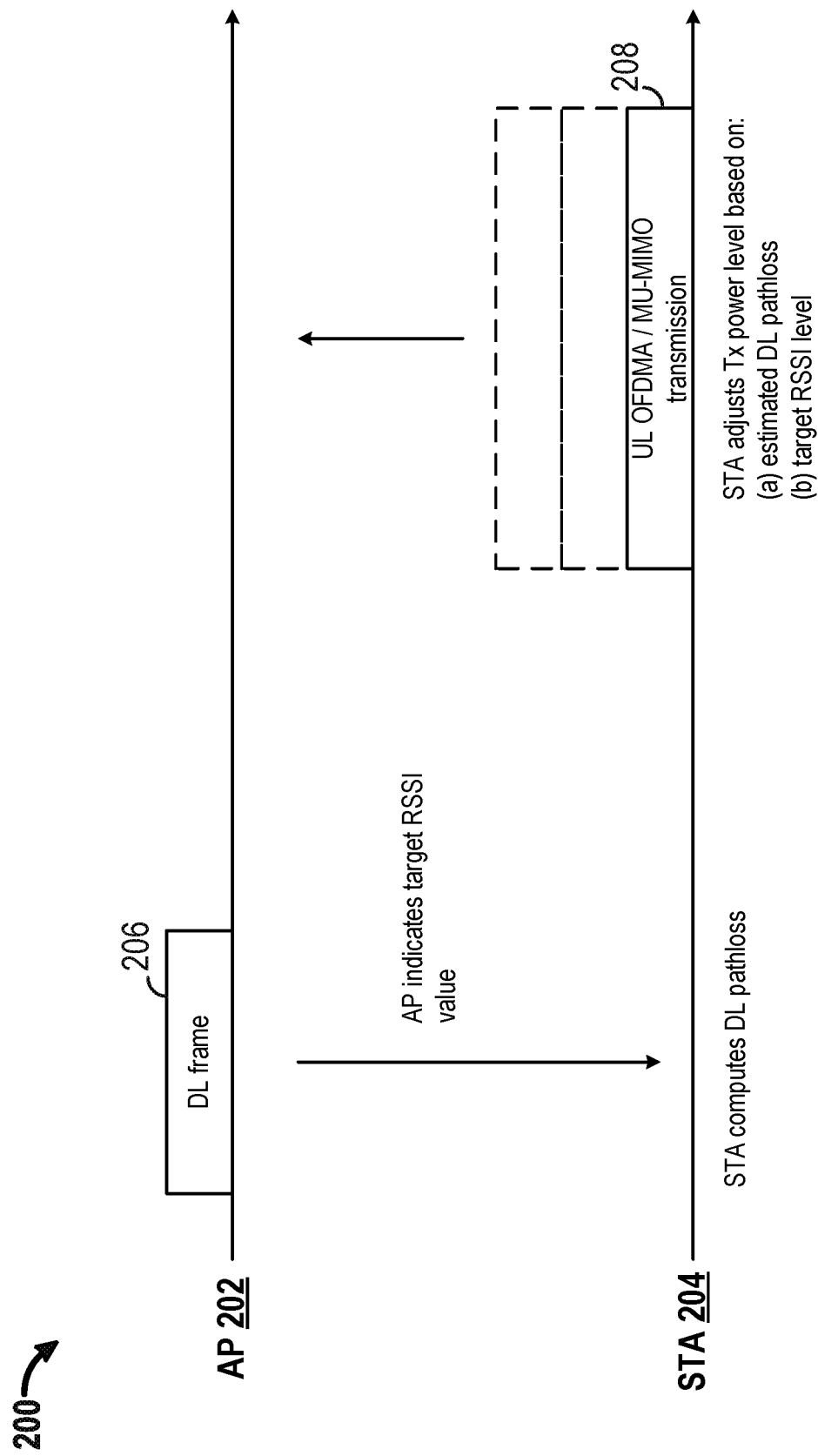
FIG. 2 illustrates a method of power control command signaling using an Rx power level option.
Figure 3:
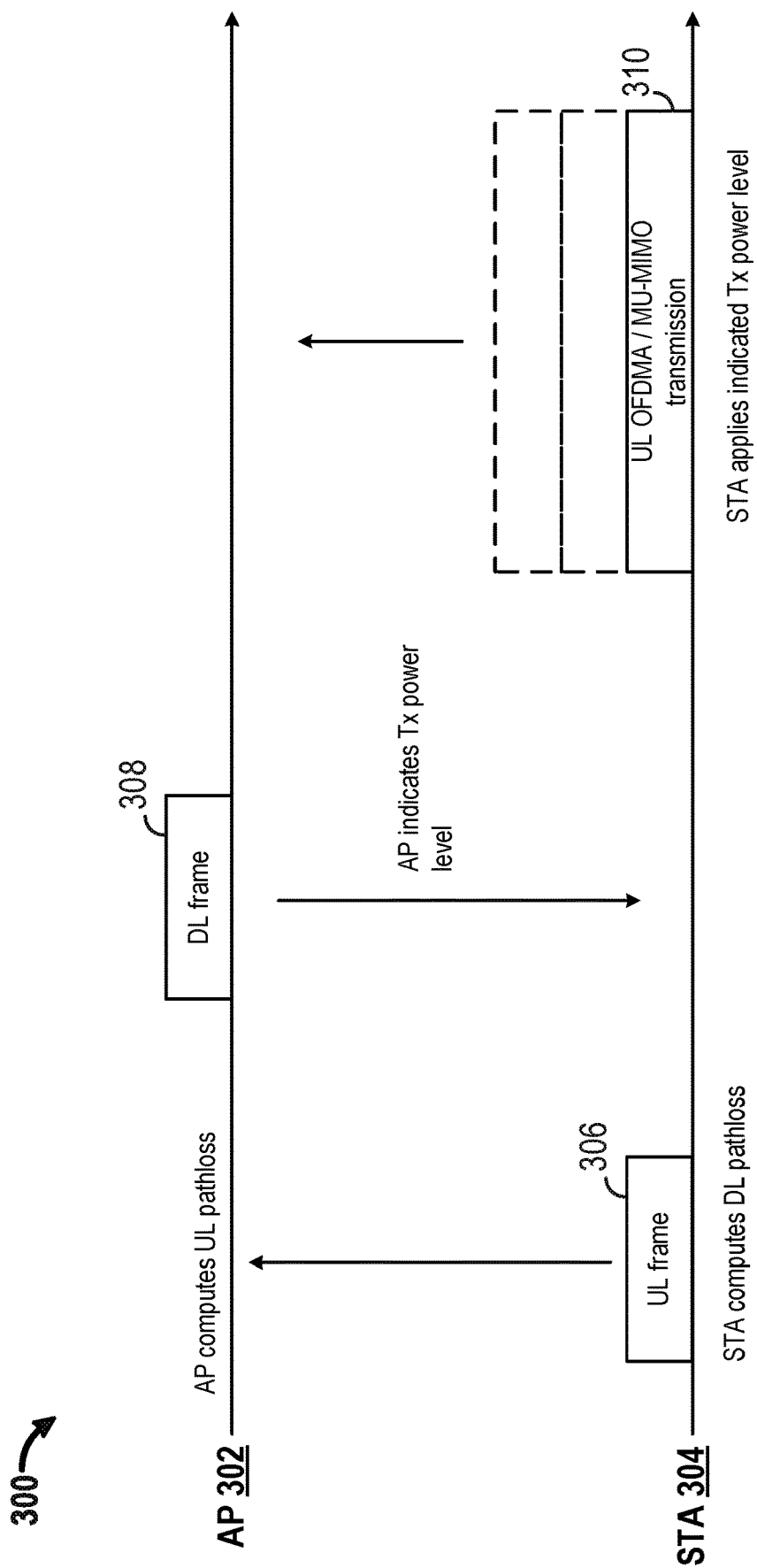
FIG. 3 illustrates a method of power control command signaling using a Tx power level indication.
Figure 4:
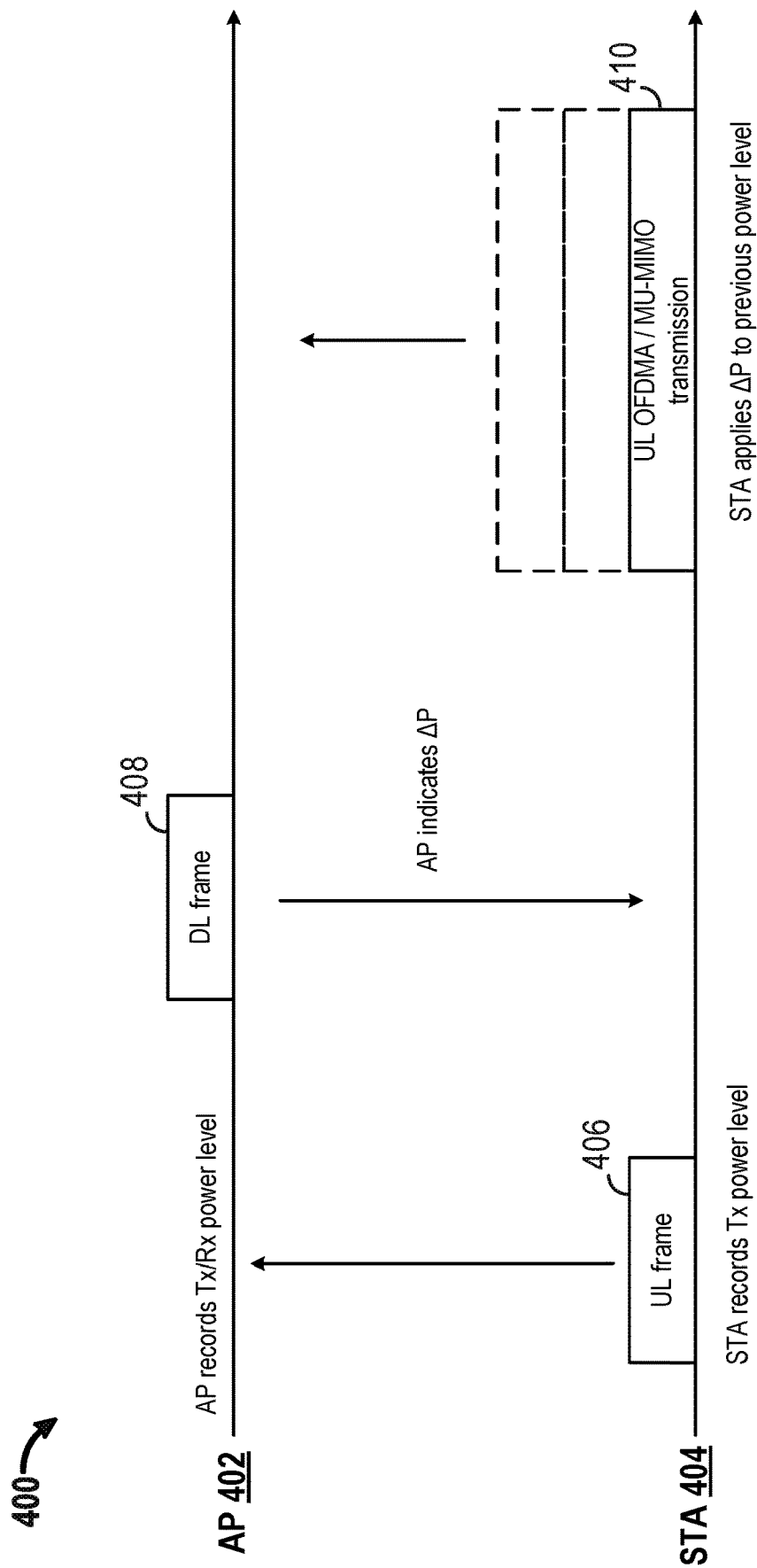
FIG. 4 illustrates a method of power control command signaling using a relative STA Tx power level indication.

Assuming closed loop power control under the individual power control option, several options for power control command signaling may be adopted: Rx power level, STA Tx power level, or relative STA Tx power level. Under the Rx power level option, the AP may indicate the desired Rx power level (or RSSI value) to be received at the AP for each STA, and in turn, the STA may determine what Tx power level to use for uplink transmission. Under the STA Tx power level option, the AP may explicitly indicate the Tx power level that each STA scheduled for transmission is to use for uplink transmission. Under the relative STA Tx power level option, the AP may indicate the change in Tx power level (JP) from a previous uplink transmission indicated for the scheduled STA. In an aspect, the change in Tx power level may be indicated by a change in Rx power level or an explicit change in Tx power level to be used by the STA. Under the relative STA Tx power level option, the AP and the STA may store the previous Tx power level associated with the STA or the previous Rx power level associated with the AP. FIGS. 2-4 discuss each of the power control command signaling options in greater detail.

FIG. 2 illustrates a method of power control command signaling using an Rx power level option. Referring to FIG. 2, an AP 202 may indicate a desired target Rx power level (or RSSI value) for uplink MU-MIMO (or OFDMA) transmission for each STA 204 in a downlink frame 206 (e.g., a trigger frame or another type of downlink frame). The target Rx power level may be determined based on a MCS and/or other factors, such as a number of users, an inter-stream management configuration of the AP 202, and grouping algorithms. For example, for an MCS value of 7 with 3 users, the AP 202 may select an Rx power level of −60 dBm. In another example, for an MCS value of 9 with 3 users, the AP 202 may select an Rx power level of −55 dBm. As such, the algorithm used to determine the specific Rx power level may depend on AP configurations. In addition to the target RSSI, the downlink frame 206 may include one or more STA identifiers (IDs) for which the downlink frame 206 is intended. The downlink frame 206 may further include other parameters such as an MCS value or index for each STA, an RU size (e.g., 26-tone RU, 52-tone RU, 106-tone RU, etc.), a transmission duration, a number of spatial streams allowed per STA, and/or an amount of padding to be used at the end of the frame. Each of the parameters may be different or the same among the different STAs.

Upon receiving the downlink frame 206, the STA 204 may compute the Tx power level to achieve the target RSSI value or Rx power level. The computation may be based on the downlink pathloss measurements and potentially other aspects such as the MCS value. The downlink pathloss may be determined based on the received downlink frame 206. For example, the downlink frame 206 may indicate the power level used by the AP 202 to transmit the downlink frame 206. The STA 204 may measure the RSSI of the received downlink frame 206, and based on the received RSSI and the transmitted power level of the AP 202 (which is also signaled in the downlink frame), the STA 204 may determine the pathloss (e.g., subtract the received RSSI from the transmitted power level of the AP 202 to obtain the pathloss). Based on the downlink pathloss, the STA 204 may determine a Tx power level that satisfies the target RSSI level for frames received at the AP 202. The STA 204 may transmit uplink OFDMA or MU-MIMO transmissions 208 to the AP 202 based on the determined Tx power level. In this option, the power control scheme is dependent on measurements and computations at both the AP 202 and the STA 204.

FIG. 3 illustrates a method of power control command signaling using a Tx power level indication. Referring to FIG. 3, an AP 302 may explicitly indicate the Tx power level of each STA 304 scheduled for transmission. The STA 304 may transmit an uplink frame 306 to the AP 302 (e.g., an uplink frame indicating the STA 304 has data to transmit and that includes a request to be scheduled for transmission). The uplink frame 306 may include the Tx power level used by the STA 304 to transmit the uplink frame 306 (or alternatively the Tx power relative to the max STA Tx power—also called the headroom which is a measure of the STA Tx power). Based on the received uplink frame 306, the AP 302 may estimate an uplink pathloss from the STA 304. For example, the AP 302 may determine the uplink pathloss based on a difference between the Tx power level used to transmit the uplink frame 306 and the received power level of the uplink frame 306 at the AP 302. The AP 302 may determine a target RSSI value, and may determine the required Tx power level to meet the target RSSI value. In an aspect, the required Tx power level may be quantized and signalized to each scheduled STA in a downlink frame 308 (e.g., a trigger frame). A trigger frame may be used because a trigger frame may be transmitted before each uplink transmission. However, other downlink frames may also be used. In an aspect, the downlink frame 308 may include one or more STA IDs and the computed Tx power level associated with each STA ID. The downlink frame 308 may include one or more parameters such as an MCS index/value, an RU size, a number of spatial streams, a transmission duration, and an amount of padding to use at the end of an uplink frame for each STA associated with the STA IDs. Upon receiving the downlink frame 308, the STA 304 may apply the indicated Tx power level and transmit uplink OFDMA or MU-MIMO transmissions 310 to the AP 302. In FIG. 3, measurements and computation are performed at the AP 302. In an aspect, uplink path loss may change during the time between uplink transmission and downlink power control command indication.

FIG. 4 is a diagram 400 of a method of power control command signaling using a relative STA Tx power level indication. Referring to FIG. 4, a STA 404 may transmit an uplink frame 406 to an AP 402. The uplink frame 406 may include the Tx power level used to transmit the uplink frame 406, and the STA 404 may record the Tx power level used to transmit the uplink frame 406. Upon receiving the uplink frame 406, the AP 402 may record the Tx power level indicated in the uplink frame 406. The AP 402 may measure the RSSI value or power level at which the uplink frame 406 was received and record the measured RSSI value/power level. In an aspect, the AP 402 may determine that a previously determined target RSSI value or Rx power level was not satisfied based on the Tx power level indicated in the uplink frame 406. In another aspect, even if the target RSSI value was satisfied, the AP 402 may determine that the uplink frame 406 was not correctly received. Accordingly, the AP 402 may determine to change the Tx power level, which is denoted by ΔP in FIG. 4. In an aspect, ΔP may represent a change in the target RSSI value or Rx power level. In another aspect, ΔP may explicitly represent the change in Tx power level to be used by the STA 404 in FIG. 4. The AP 402 may indicate ΔP in a downlink frame 408 transmitted to the STA 404. In an aspect, the downlink frame 408 may be a trigger frame. In another aspect, the downlink frame 408 may include one or more STA IDs and the ΔP associated with each STA ID. The downlink frame 408 may include one or more parameters such as an MCS index/value, an RU size, a number of spatial streams, a transmission duration, and an amount of padding to use at the end of an uplink frame for each STA associated with the STA IDs. Upon receiving the downlink frame 408, the STA 404 may apply the indicated ΔP to the previous power level. For example, if ΔP represents an explicitly change in Tx power level, the STA 404 may adjust the Tx power level based on AP. On the other hand, if ΔP represents a change in the target RSSI value, the STA 404 may adjust a previously recorded target RSSI value based on ΔP to determine an adjusted target RSSI value. Based on the adjusted target RSSI value, the STA 404 may compute a new Tx power level.

In FIG. 4, the STA 404 may need to keep track of the transmit power level applied for all uplink transmissions 410. In an aspect, both the AP 402 and the STA 404 may maintain power control parameters. In this method, measurements and computations may be performed primarily at the AP 402. Also, uplink pathloss may change during the time between uplink transmission and the downlink power control command indication.

In an aspect, a combination of the power control command signaling as discussed in FIGS. 2-4 may be utilized. For example, a STA and an AP may utilize the Rx power level and the relative STA Tx power level. In another example, the STA and the AP may utilize the STA Tx power level and the relative STA Tx power level. Also, for FIGS. 2-4, the STA may signal an uplink Tx power level or the Tx power level headroom that the STA used to transmit uplink frames, and the AP may signal a downlink Tx power level that the AP used to transmit downlink frames.

Figure 5:
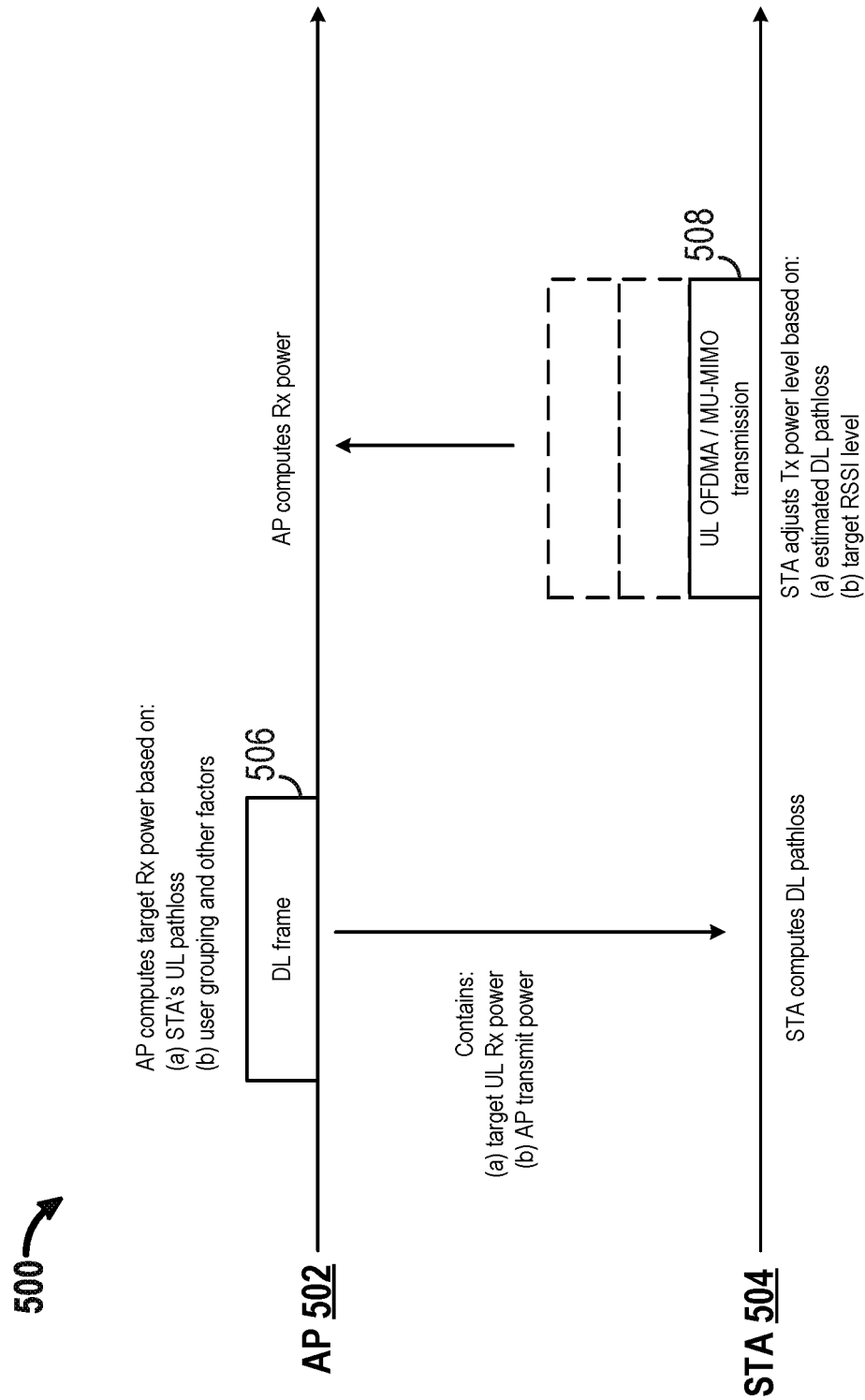
FIG. 5 is a diagram illustrating a detailed description of an Rx power level option for power control command signaling.

FIG. 5 is a diagram 500 illustrating a detailed description of an Rx power level option for power control command signaling. Referring to FIG. 5, to perform uplink power control, an AP 502 may determine the uplink RSSI target based on an uplink pathloss with respect to a STA 504, a user grouping, a maximum and/or a minimum power level of the STA 504 that may be signaled by the STA 504 during association, a transmission history between the AP 502 and the STA 504, outer-loop adjustments, and/or other factors. User grouping may correspond to a number of users scheduled to transmit on the uplink to the AP 502. In an aspect, the uplink RSSI target may be chosen for an entire bandwidth (e.g., 20 megahertz (MHz), 40 MHz, 80 MHz, 160 MHz). In another aspect, the uplink RSSI target may be chosen or specified for a single RU. In another aspect, RSSI levels for sub-20 MHz RUs may not vary significantly because multiple antennas at the AP 502 may reduce frequency diversity. Upon determining the uplink RSSI target, the AP 502 may indicate the uplink RSSI target to each STA by transmitting the uplink RSSI target on the downlink via a trigger frame 506. The AP 502 may transmit the trigger frame 506 to the STA 504, and the trigger frame 506 may include the uplink RSSI target (or another indication of Rx power level). The trigger frame 506 may include the transmit power level used by the AP 502 to transmit the trigger frame 506. In an aspect, the AP 502 may transmit a different trigger message to each respective STA.

Upon receiving the trigger frame 506, the STA 504 may compute the downlink pathloss. The STA 504 may compute or estimate the downlink pathloss by measuring the power level or RSSI value of the received trigger frame 506. In an aspect, the downlink pathloss may be computed based on Eq. 1:

$$\widehat{PL_{DL}} = (P_{TX}^{AP} + \partial_{TX}^{AP}) - (RSSI_{STA} + \partial_{RSSI}^{STA})$$
$$= P_{TX}^{AP} - RSSI_{STA} + \partial_{TX}^{AP} - \partial_{RSSI}^{STA}$$
$$= PL_{DL} + \partial_{TX}^{AP} - \partial_{RSSI}^{STA}$$

Referring to Eq. 1, $\widehat{PL_{DL}}$ may represent the measured downlink pathloss, $P_{TX}^{AP}$ may represent the actual transmitted power from the AP 502, $\partial_{TX}^{STA}$ may represent an error corresponding to the difference between the Tx power signaled on the downlink frame (e.g., trigger frame) and the actual transmitted power, $RSSI_{STA}$ may represent the actual RSSI of the trigger frame 506 at the STA 504, and $\partial_{RSSI}^{STA}$ may represent the measurement error at the STA 504 with respect to the RSSI of the received trigger frame 506. Referring to Eq. 1, $(P_{TX}^{AP} + \partial_{TX}^{AP})$ may represent the Tx power level that is signaled in the trigger frame 506, and $(RSSI_{STA} + \partial_{RSSI}^{STA})$ may represent the measured RSSI of the received trigger frame 506 at the STA 504. $PL_{DL}$ may represent the actual downlink pathloss. To determine $PL_{DL}$, however, error correction may need to be performed. Different error correction methods will be discussed subsequently.

After computing the downlink pathloss, the STA 504 may compute the uplink transmit power level based on the computed DL pathloss and the uplink RSSI target. In an aspect, the STA 504 may compute the uplink Tx power based on Eq. 2:

$$\widehat{P_{TX}^{STA}} = \widehat{PL_{DL}} + RSSI_{Target}$$

$$P_{TX}^{STA} + \partial_{TX}^{STA} = \widehat{PL_{DL}} + RSSI_{Target}$$

$$P_{TX}^{STA} = PL_{DL} + RSSI_{Target} + \partial_{TX}^{AP} - \partial_{RSSI}^{STA} - \partial_{TX}^{STA}$$

Referring to Eq. 2, $\widehat{P_{TX}^{STA}}$ may represent the computed Tx power level at the STA 504, and $\widehat{P_{TX}^{STA}}$ may be signaled via an uplink frame, $\partial_{TX}^{STA}$ may be an error that represents the difference between the computer Tx power level (or the applied power on the uplink frame) and the actual transmitted power of the uplink frame 508, and $P_{TX}^{STA}$ may represent the actual transmitted power of the uplink frame. The STA 504 may transmit the uplink frame 508 (MU-MIMO packet or OFDMA packet) using the computed uplink Tx power level.

Referring to FIG. 5, the uplink MU transmission (or uplink OFDMA transmission) may be received at the AP 502. The AP 502 may measure the Rx power level from the STA 504 based on Eq. 3:

$$P_{RX}^{AP} = P_{TX}^{STA} - PL_{UL} + \partial_{RSSI}^{AP}$$
$$= (PL_{DL} - PL_{UL}) + RSSI_{Target} + \partial_{TX}^{AP} - \partial_{RSSI}^{STA} - \partial_{TX}^{STA} + \partial_{RSSI}^{AP}$$

Referring to Eq. 3, $\partial_{RSSI}^{AP}$ may be an RSSI measurement error at the AP 502. Based on the Eq. 3, the measured power control error may be derived according to Eq. 4:

$$(P_{RX}^{AP} - RSSI_{Target}) = \partial_{UL\_DL} + \partial_{TX}^{AP} - \partial_{RSSI}^{STA} - \partial_{TX}^{STA} + \partial_{RSSI}^{AP}$$

Referring to Eq. 4, $P_{RX}^{AP} - RSSI_{Target}$ may represent the measured power control error, and $\partial_{UL\_DL}$ may represent the error between the actual downlink pathloss and the actual uplink pathloss.

Based on Eq. 4, the excluding the AP measurement error, the actual power control error may be determined using Eq. 5:

$$(RSSI_{AP} - RSSI_{Target}) = \partial_{UL\_DL} + \partial_{TX}^{AP} - \partial_{RSSI}^{STA} - \partial_{TX}^{STA}$$

As shown in Eqs. 1-5, power control errors may need to be accounted for to enable accurate and reliable power management. Power control errors may be caused by bias and power imbalances. Power control errors may be affected by changes in temperature and large changes in pathloss. In some instances, power control errors may be considered to be slow varying. That is, the power control errors may remain relatively constant every few milliseconds. Accordingly, power control errors may be accounted for and corrected over the short term.

Different mechanisms may be used for error correction. The mechanisms include: calibration through message exchange (both the AP and the STA are involved in the mechanism), AP centric correction (calibration messages are exchanged but error correction is done by the AP), and outer-loop based correction (AP attempts to correct the errors without using calibration messages). Each of the error correction mechanisms will be discussed in greater detail in FIGS. 6 and 7.

Figure 6:
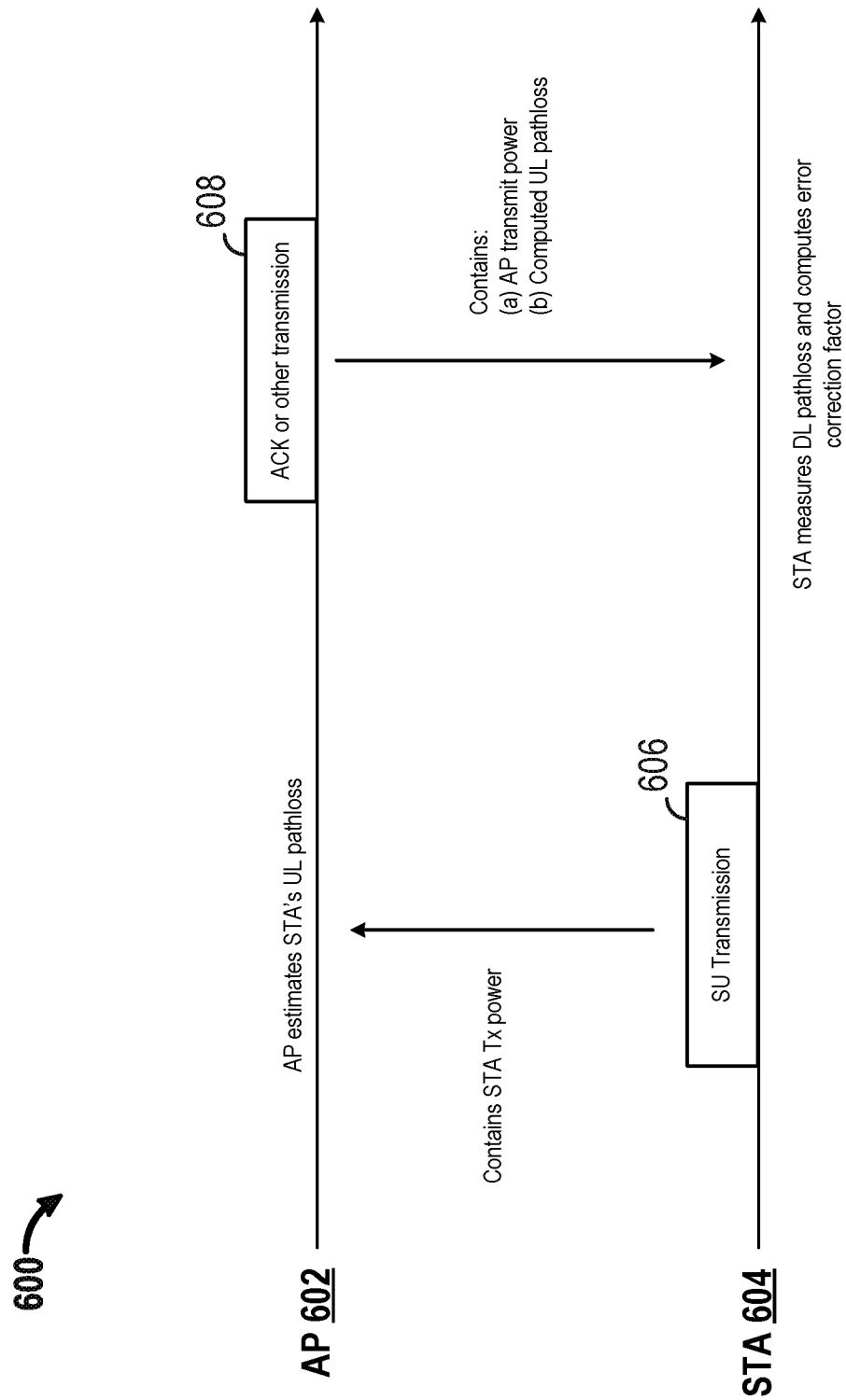
FIG. 6 illustrates a method of error correction in power control using a calibration message exchange.

FIG. 6 is a diagram 600 that illustrates a method of error correction in power control using a calibration message exchange. Referring to FIG. 6, an AP 602 and a STA 604 may exchange messages to enable the STA 604 to perform error correction in power control. The STA 604 may transmit a uplink single-user (SU) transmission 606 to the AP 602. The uplink SU transmission may be a request to transmit a message, for example, that indicates that the STA 604 has data to transmit and the STA 604 is requesting to be scheduled for transmission by the AP 602. The SU transmission 606 may indicate that transmit power used by the STA 604 to transmit the SU transmission 606. Upon receiving the SU transmission 606, the AP 602 may estimate an uplink pathloss for the SU transmission 606. In an aspect, the AP 602 may estimate the pathloss based on Eq. 6:

$$\widetilde{PL_{UL}} = (P_{TX}^{STA} + \partial_{TX}^{STA}) - (RSSI_{AP} + \partial_{RSSI}^{AP})$$
$$= P_{TX}^{STA} - RSSI_{AP} + \partial_{TX}^{STA} - \partial_{RSSI}^{AP}$$
$$= PL_{UL} + \partial_{TX}^{STA} - \partial_{RSSI}^{AP}$$

Referring to FIG. 6, the AP 602 may transmit the estimated pathloss in an ACK message 608 or another downlink message transmitted to the STA 604. The ACK message 608 or the another downlink message may indicate the power level used by the AP 602 to transmit the ACK message 608 or the another downlink message. Upon receiving the ACK message 608 or the another downlink message, the STA 604 may estimate the downlink pathloss. In an aspect, the STA 604 may estimate the downlink pathloss based on Eq. 7:

$$\widetilde{PL_{DL}} = (P_{TX}^{AP} + \partial_{TX}^{AP}) - (RSSI_{STA} + \partial_{RSSI}^{STA})$$
$$= P_{TX}^{AP} - RSSI_{STA} + \partial_{TX}^{AP} - \partial_{RSSI}^{STA}$$
$$= PL_{DL} + \partial_{TX}^{AP} - \partial_{RSSI}^{STA}$$

Based on the estimated downlink pathloss, the STA 604 may compute the error correction based on Eq. 8:

$$\epsilon_{UL\_DL} = \widetilde{PL_{UL}} - \widetilde{PL_{DL}}$$
$$= PL_{UL} + \partial_{TX}^{STA} - \partial_{RSSI}^{AP} - (PL_{DL} + \partial_{TX}^{AP} - \partial_{RSSI}^{STA})$$
$$= \partial_{TX}^{STA} - \partial_{RSSI}^{AP} - \partial_{TX}^{AP} + \partial_{RSSI}^{STA} - \partial_{UL\_DL}$$

Referring to Eq. 8, $\epsilon_{UL\_DL}$ may represent the power control measurement error and may be referred to as the error correction term. In an aspect, $\epsilon_{UL\_DL}$ may be stored in the STA 604 to be used when the STA 604 is scheduled for UL transmission. The STA 604 may apply the error correction term when the STA 604 computes a Tx power level to be used for transmitting an uplink frame to the AP 602. The effective uplink Tx power level after error correction is applied may be determined by Eq. 9:

$$P_{TX}^{STA} = PL_{DL} + RSSI_{Target} + \partial_{TX}^{AP} - \partial_{RSSI}^{STA} - \partial_{TX}^{STA} + \epsilon_{UL\_DL}$$

Upon receiving the uplink transmission, the AP 602 may measure the receiver power level based on Eq. 10:

$$P_{RX}^{AP} = RSSI_{Target} + \partial_{UL\_DL} + \partial_{TX}^{AP} - \partial_{RSSI}^{STA} - \partial_{TX}^{STA} + \epsilon_{UL\_DL}$$

wherein the term: $\partial_{UL\_DL} + \partial_{TX}^{AP} - \partial_{RSSI}^{STA} - \partial_{TX}^{STA} + \partial_{RSSI}^{AP} + \epsilon_{UL\_DL} = 0$ Referring to Eq. 10, the measurement errors may cancel out due to calibration. In an aspect, the actual received power at the AP 602 may be different from the measured Rx power level. The performance of the uplink frame may be based on the actual Rx power level.

In an aspect, calibration may not account for random errors (e.g., errors due to power amplifier gain stage switch, etc.). An AP may need to maintain an outer-loop on the RSSI target to track any residual bias. That is, the AP may modify the RSSI target using a process that does not involve the STA. For example, the AP may maintain an outer-loop on the RSSI target using Eq. 11:

$$RSSI_{Target}(n) + \Delta(n-1)$$

Referring to Eq. 11, $RSSI_{Target}(n)$ corresponds to the RSSI target for the $n^{th}$ transmission (OFDMA or MU-MIMO), and $\Delta(n-1)$ corresponds to an error correction factor that depends on residual errors between the measured RSSI and the target RSSI and/or RSSI target adjustments due to packet decoding performance. That is, the RSSI target for the $n^{th}$ transmission may depend on the error correction factor, $\Delta(n-1)$, for the $n-1^{th}$ transmission. And the error correction factor $\Delta(n-1)$ may be adjusted if the measured RSSI does not meet the target RSSI and/or if the packet from the $n-1^{th}$ transmission was not correctly received or decoded (this may include cases in which the target RSSI was met but the packet was not correctly decoded or received). In an aspect, the error correction factor may be time varying and therefore depend on one or more previously received packets (e.g., $\Delta(n-1) = [\epsilon_{corr}]\alpha + \Delta(n-2)(1-\alpha)$. Other mechanisms for adjusting the error correction factor may also be applied. In another aspect, errors may change over time, and thus, calibration may be performed periodically.

Figure 7:
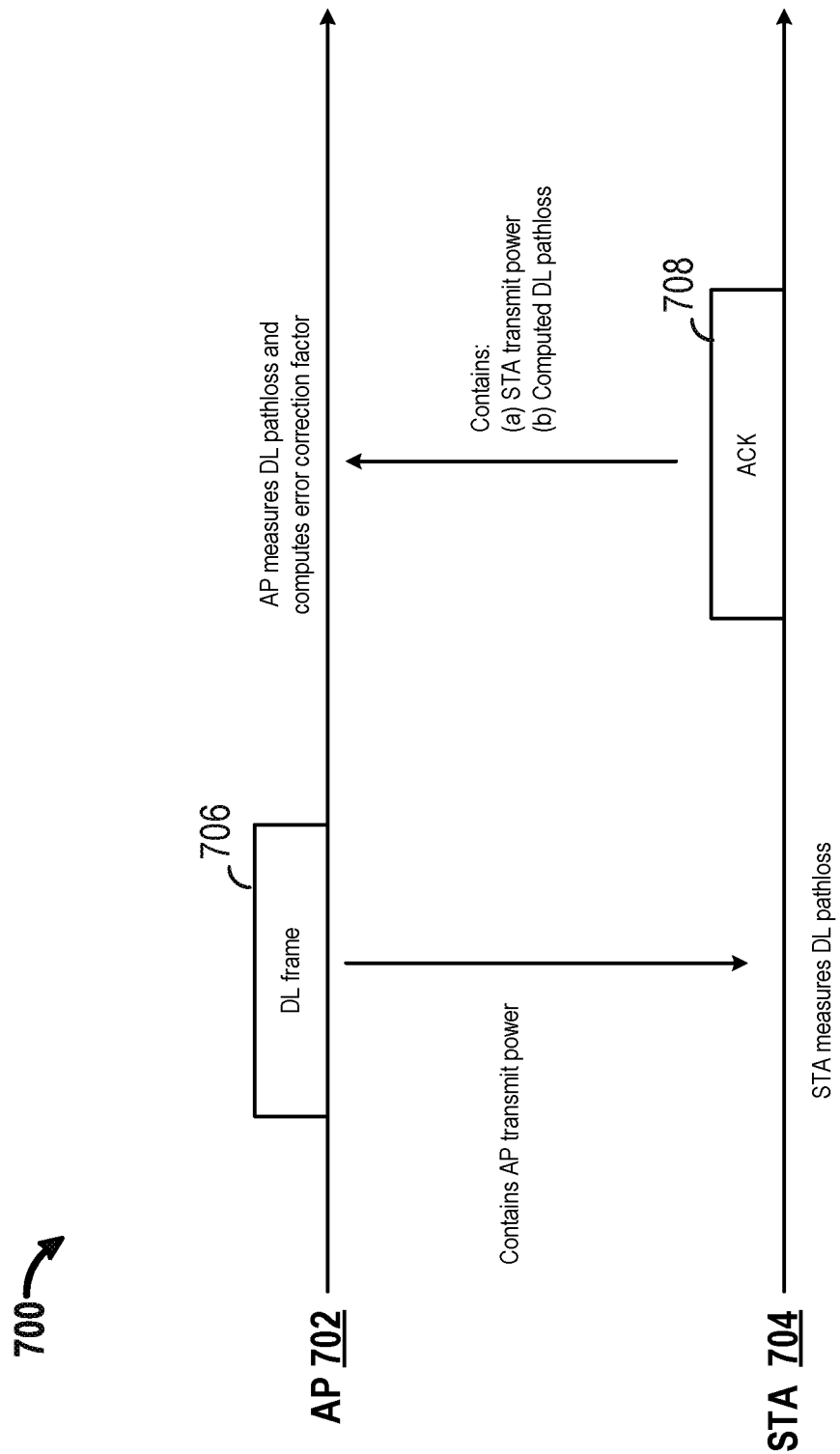
FIG. 7 illustrates a method of AP centric error correction in power control.

FIG. 7 is a diagram 700 that illustrates a method of AP centric error correction in power control. Referring to FIG. 7, an AP 702 and a STA 704 may exchange messages to enable the AP 702 to perform error correction in power control. The AP 702 may transmit a downlink frame 706 to the STA 704. The downlink frame 706 may include the transmit power used by the AP 702 to transmit the downlink frame 706. Upon receiving the downlink frame 706, the STA 704 may estimate the downlink pathloss based on the downlink frame 706. The STA 704 may transmit the estimated downlink pathloss in a uplink frame 708 (e.g., an ACK frame). The uplink frame 708 may include the STA transmit power used to transmit the uplink frame 708 and the estimated downlink pathloss computed by the STA 704. Upon receiving the uplink frame 708, the AP 702 may measure the downlink pathloss based on the received uplink frame 708. The AP 702 may also compute the error correction factor/metric based on the computed uplink pathloss and received downlink pathloss. For example, the error correction metric may be computed based on Eq. 12:

$$\epsilon_{UL\_DL} = \widehat{PL_{UL}} - \widehat{PL_{DL}}$$

Referring to Eq. 12, $\epsilon_{UL\_DL}$ may correspond to the error correction metric. The AP 702 may apply the error correction metric, $\epsilon_{UL\_DL}$, to the target RSSI, such that $RSSI_{Target} + \epsilon_{UL\_DL}$ is the new target RSSI to be indicated to the STA 704 for uplink transmission. Based on the calibration, the AP 702 may remove measurement bias. In an aspect, the AP 702 may store the error correction metric and update the error correction metric as needed (e.g., when the target RSSI is not met or when packets are unsuccessfully decoded). In another aspect, the STA 704 may not need to store any error correction metrics because the corrections are performed at the AP 702. In another aspect, the downlink frame transmission may not occur immediately before an uplink MU-MIMO (or OFDMA) transmission. Also, as previously discussed, the request for uplink transmission may be used as a message for calibration instead of an ACK message.

In addition to the two different message exchange mechanisms, a third mechanism for error correction may be an outer-loop error correction mechanism. In this mechanism, an AP may compute the error between the RSSI target the Rx power level of a received uplink frame based on Eq. 13:

$$(\widehat{P_{RX}^{AP}} - RSSI_{Target}) = \Delta = \partial_{UL\_DL} + \partial_{TX}^{AP} - \partial_{RSSI}^{STA} - \partial_{TX}^{STA}$$

Referring to Eq. 13, the AP may adjust the RSSI target based on the error in the previous transmission, such that $RSSI_{Target}(n) + \Delta(n-1)$, where $\Delta(n-1) = (\widehat{P_{RX}^{AP}} - RSSI_{Target}(n-1))$. In other words, the AP may iterate through multiple received uplink frames. For each received uplink frame, the AP may determine a difference between the RSSI target and the received power level. The difference may represent the error correction factor, which is used to update the RSSI target for the next uplink transmission. The AP may repeat this process to reduce power control error.

In an aspect, outer-loop based error correction may not correct the RSSI measuring error, $\partial_{RSSI}^{AP}$, at the AP. While RSSI measuring error at the AP may not affect the power imbalance between scheduled users, RSSI measuring error may affect power control performance because the actual received power may be different from the measured RSSI.

In another aspect, maintaining an outer-loop on the error may help reduce the effects of measurement error, although the first MU-MIMO transmissions may not be successful. Convergence of the outer loop may be long, however, and pathloss and errors may change in the interim, which may compromise performance.

Figure 8:
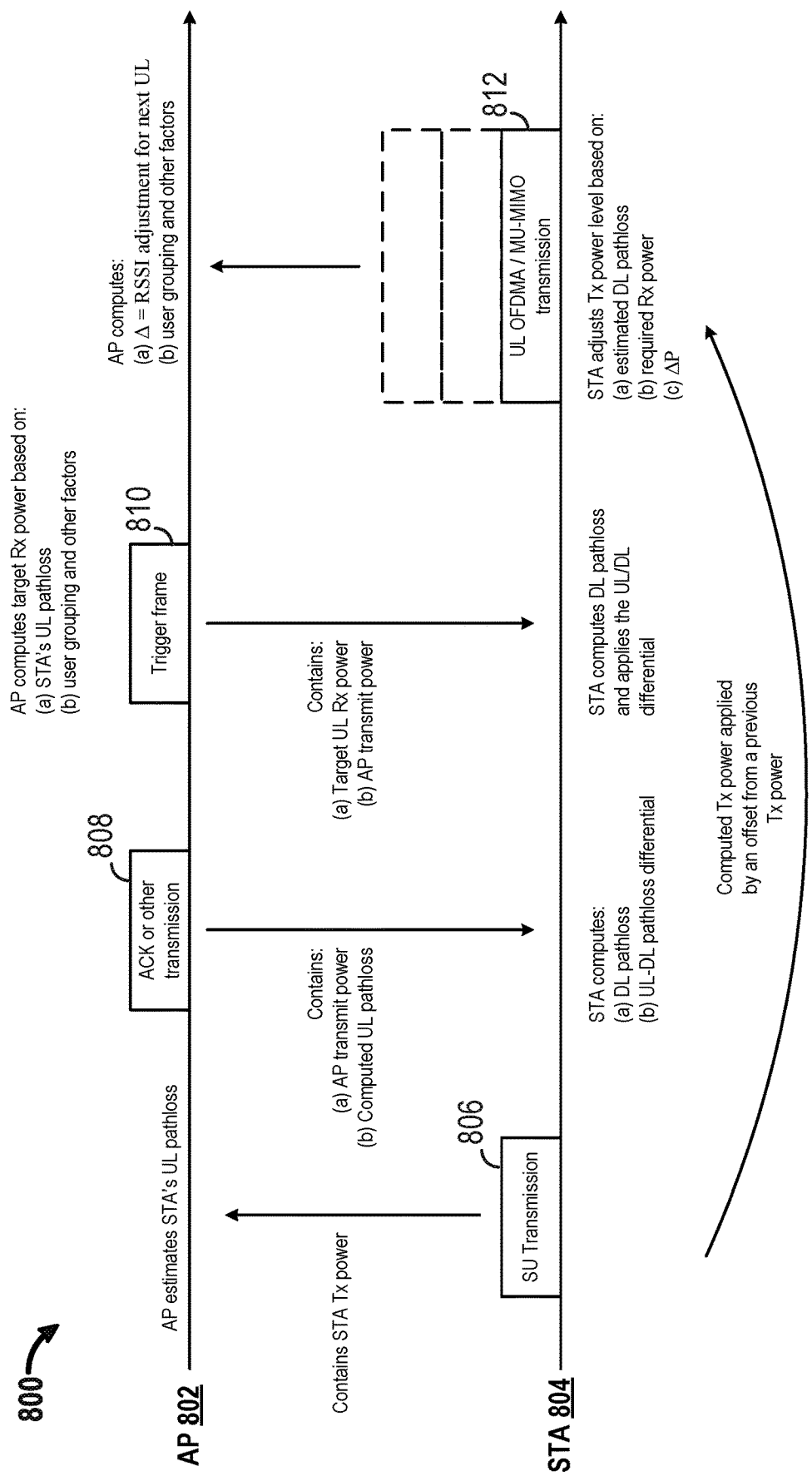
FIG. 8 illustrates an exemplary overview of a power control mechanism with calibration messages.

FIG. 8 illustrates an exemplary overview of a power control mechanism with calibration messages. Referring to FIG. 8, a STA 804 may send an AP 802 an SU UL transmission 806 (e.g., a request to transmit message). The SU UL transmission 806 may include the transmit power used by the STA 804 to transmit the SU UL transmission 806. Upon receiving the SU UL transmission 806, the AP 802 may estimate the STA's UL pathloss. Subsequently, the AP 802 may transmit a downlink frame 808 (e.g., an ACK frame) to the STA 804. The downlink frame 808 may include the AP transmit power used to transmit the downlink frame 808 and/or the computed UL pathloss. Upon receiving the downlink frame 808, the STA 804 may compute the downlink pathloss and compute the uplink and the downlink pathloss differential. Subsequently, the AP 802 may compute a target RSSI or target Rx power based on the STA's uplink pathloss, user grouping, and/or other factors. The AP 802 may transmit the computed targeted Rx power level to the STA 804 in a trigger frame 810. The trigger frame 810 may also include the AP transmit power used to transmit the trigger frame 810. Upon receiving the trigger frame 810, the STA 804 may compute the downlink pathloss and apply the UL/DL differential. Subsequently, the STA 804 may transmit data to the AP 802 in an uplink MU-MIMO (or OFDMA) transmission 812. The STA 804 may transmit the data with an adjusted Txt power level based on the estimated DL pathloss that has been error corrected and on the target Rx power level. In an aspect, for subsequent transmissions, the adjusted Tx power level may further be adjusted if the AP 802 indicates a change in the target RSSI or in the Tx power level (e.g., ΔP) at the STA 804.

The aforementioned paragraphs discussed various signaling options for power control in uplink transmissions. The tables below provide further detail on the various station capability signaling details. The details listed in Table 2 may be signaled by the station during association with the AP.

TABLE 2

Station Capability Signaling

| Parameter | Value (Example) | Comments |
|---|---|---|
| Max Tx power for each of the following RU sizes (# of tones): 26-tone RU, 52-tone RU, 106-tone RU, 242-tone RU, 484-tone RU, 996-tone RU, 2x996-tone RU) | 20 dBm (or 24 dBm) | Maximum STA transmit power for a particular RU size |
| Max Tx power for each bandwidth (e.g., 20 MHz, 40 MHz, 80 MHz, 160 MHz) | 20 dBm (or 24 dBm) | Maximum STA transmit power for a particular bandwidth |
| Max Tx power for each MCS | 20 dBm (or 24 dBm) | Maximum STA transmit power for a particular MCS |
| Min Tx power | −20 dBm | Minimum STA transmit power |

Referring to Table 2, a maximum transmit power for each RU size, bandwidth, and/or MCS may be indicated by a station according to the station's bandwidth capability. An AP may need to know the limits of the station's transmit power in order to provide power control commands that may be applied at the station.

TABLE 3

Station Uplink Signaling

| Parameter | Range (Example) | Comments |
|---|---|---|
| STA Tx power (per tone) | 20 dBm to −20 dBm Range: 40 dB in 1 dB increments | Tx power may include any adjustments made, such as MCS, meeting power spectral density requirements, and/or previous power control signaling |
| STA Tx power (per bandwidth) | 20 dBm to −20 dBm Range: 40 dB in 1 dB increments | Tx power may include any adjustments made, such as MCS, meeting power spectral density requirements, and/or previous power control signaling |

Referring to Table 3, in an uplink frame (e.g., the SU UL transmission 806), a station may indicate the applied Tx power. An AP may use the applied Tx power to estimate the current pathloss for the STA based on the measured received power of the uplink frame at the STA.

TABLE 4

Access Point Downlink Signaling

| Parameter | Range (Example) | Comments |
|---|---|---|
| Target Rx power | −25 dBm to −85 dBm Range: 60 dBm in 1 dB increments | Expected Rx power from a STA. The STA computes the Tx power based on DL pathloss measurements from a trigger message. |
| Target Tx power | −25 dBm to −85 dBm Range: 60 dBm in 1 dB increments | Instructed Tx power for a STA. The STA utilizes the Tx power without having to compute the Tx power based on DL pathloss measurements from a trigger message. |
| AP Tx Power | 20 dBm to −20 dBm Range: 40 dB in 1 dB increments | Tx power includes any adjustments made such as MCS and meeting power spectral density requirements. |

Referring to Table 4, in a downlink frame (e.g., the trigger frame 810), an AP may indicate a target received power for a scheduled STA or a target transmit power to be used by the STA for uplink transmission. The downlink frame may include an AP transmit power applied to the downlink frame.

Figure 9:
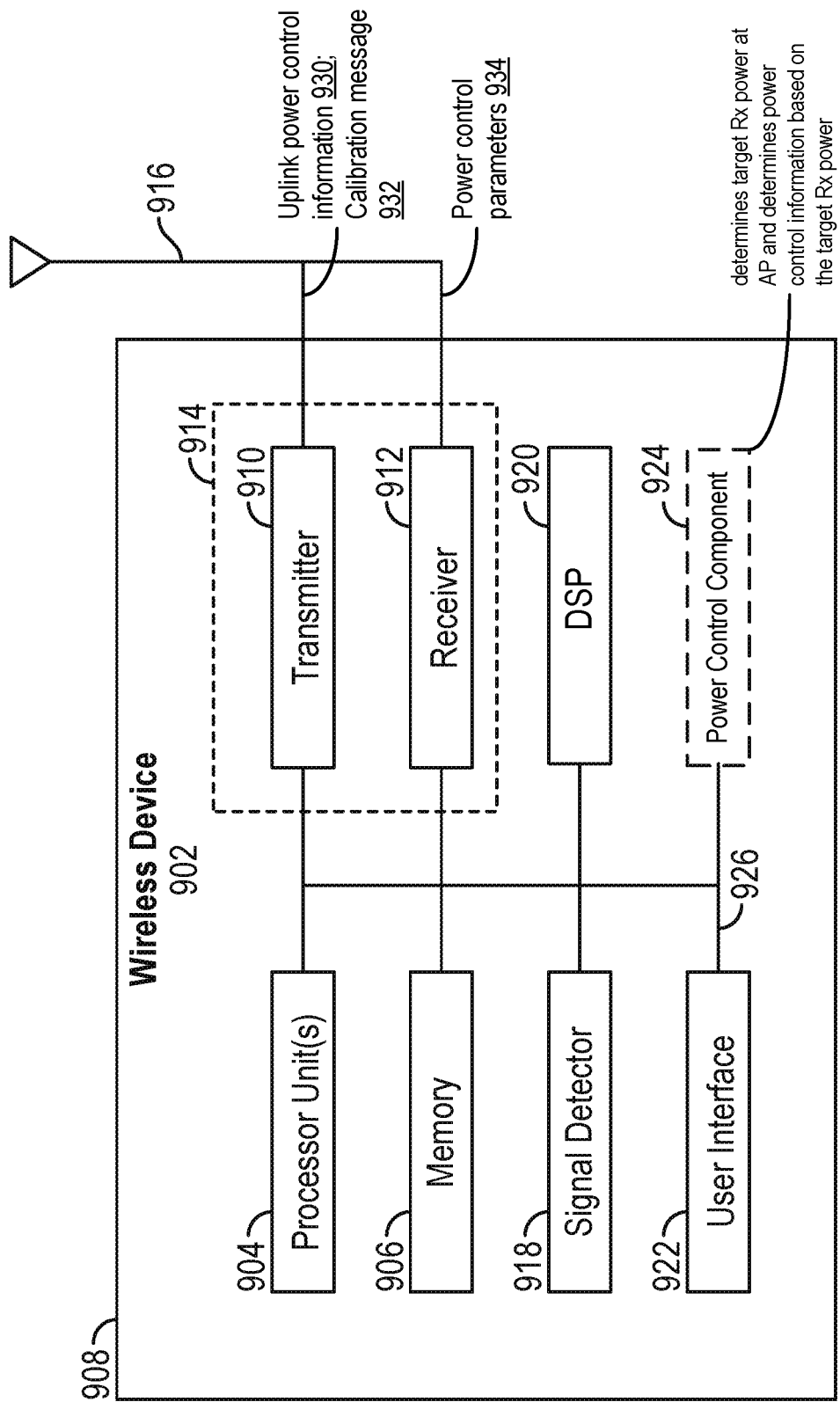
FIG. 9 shows an example functional block diagram of a wireless device that may be employed within the wireless communication system of FIG. 1.

FIG. 9 shows an example functional block diagram of a wireless device 902 that may be employed within the wireless communication system 100 of FIG. 1. The wireless device 902 is an example of a device that may be configured to implement the various methods described herein. For example, the wireless device 902 may comprise the AP 104.

The wireless device 902 may include a processor 904 which controls operation of the wireless device 902. The processor 904 may also be referred to as a central processing unit (CPU). Memory 906, which may include both read-only memory (ROM) and random access memory (RAM), may provide instructions and data to the processor 904. A portion of the memory 906 may also include non-volatile random access memory (NVRAM). The processor 904 typically performs logical and arithmetic operations based on program instructions stored within the memory 906. The instructions in the memory 906 may be executable (by the processor 904, for example) to implement the methods described herein.

The processor 904 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 902 may also include a housing 908, and the wireless device 902 may include a transmitter 910 and/or a receiver 912 to allow transmission and reception of data between the wireless device 902 and a remote device. The transmitter 910 and the receiver 912 may be combined into a transceiver 914. An antenna 916 may be attached to the housing 908 and electrically coupled to the transceiver 914. The wireless device 902 may also include multiple transmitters, multiple receivers, multiple transceivers, and/or multiple antennas.

The wireless device 902 may also include a signal detector 918 that may be used to detect and quantify the level of signals received by the transceiver 914 or the receiver 912. The signal detector 918 may detect such signals as total energy, energy per subcarrier per symbol, power spectral density, and other signals. The wireless device 902 may also include a DSP 920 for use in processing signals. The DSP 920 may be configured to generate a packet for transmission. In some aspects, the packet may comprise a physical layer convergence protocol (PLCP) protocol data unit (PPDU).

The wireless device 902 may further comprise a user interface 922 in some aspects. The user interface 922 may comprise a keypad, a microphone, a speaker, and/or a display. The user interface 922 may include any element or component that conveys information to a user of the wireless device 902 and/or receives input from the user.

When the wireless device 902 is implemented as an AP (e.g., AP 104), the wireless device 902 may also comprise a power control component 924. The power control component 924 may be configured to determine a target receiver power level for uplink transmissions received at the wireless device 902. The power control component 924 may be configured to determine uplink power control information 930 based on the determined target receiver power level for UL MU-MIMO transmission or UL OFDMA transmission. The power control component 924 may be configured to transmit a frame that includes the determined uplink power control information 930 to a station scheduled by the wireless device 902 for uplink transmission. In another configuration, the power control component 924 may be configured to receive power control parameters 934 from the station. The power control parameters may include at least one of a dynamic power range of the station, an absolute transmit power accuracy of the station, a relative transmit power accuracy of the station, a transmit power step size of the station, a maximum transmit power associated with one or more MCSs, a minimum transmit power associated with the one or more MCSs, or a maximum transmit power associated with one or more RU sizes, a minimum transmit power associated with one or more RU sizes. In an aspect, the uplink power control information may be determined based on the received power control parameters. In another aspect, the uplink power control information may be determined based on one or more of an MCS to be used by each scheduled station, an uplink pathloss of each scheduled station, a maximum transmit power for each scheduled station, a minimum transmit power for each scheduled station, a number of stations scheduled for uplink transmission on a same RU, a transmission history for each scheduled station, and an RU size. In another aspect, the determined uplink power control information controls uplink transmit power for a single station scheduled for transmission, for all stations scheduled for transmission, or for a subset stations scheduled for transmission. In another aspect, the determined uplink power control information may include the determined target receiver power level, a transmit power level, or a relative power level change from a previous transmission. In another aspect, the frame may further include a downlink transmit power for transmitting the frame, and the determined uplink power control information may include the determined target receiver power level. In another aspect, the determined uplink power control information may include a transmit power level based on a pathloss from the station to wireless device 902. In another aspect, the frame may be a trigger frame, and the determined uplink power control information is transmitted in the trigger frame. In another configuration, the power control component 924 may be configured to receive an UL SU transmission from the station. The UL SU transmission may include a first transmit power used to transmit the UL SU transmission. The power control component 924 may be configured to estimate an uplink pathloss from the station based on the received UL SU transmission and to transmit a calibration message 932 to the station that includes a second transmit power used to transmit the calibration message 932 and the estimated uplink pathloss. The calibration message 932 may enable computation of an error correction factor. In another configuration, the power control component 924 may be configured to transmit a message to the station. The message may include a first transmit power used to transmit the message. The power control component 924 may be configured to receive an acknowledgment message from the station. The acknowledgment message may include a second transmit power used to transmit the acknowledgment message and an estimated downlink pathloss based on the transmitted message. The power control component 924 may be configured to estimate an error correction factor based on the received acknowledgment message. In another configuration, the power control component 924 may be configured to receive an UL MU MIMO transmission or an UL OFDMA transmission from the station based on the determined uplink power control information in the transmitted frame. In yet another configuration, the power control component 924 may be configured to determine a difference between the determined target receiver power level and a received power level of the UL MU MIMO transmission or the UL OFDMA transmission. In this configuration, the power control component 924 may be configured to adjust the target receiver power level based on the determined difference.

The various components of the wireless device 902 may be coupled together by a bus system 926. The bus system 926 may include a data bus, for example, as well as a power bus, a control signal bus, and a status signal bus in addition to the data bus. Components of the wireless device 902 may be coupled together or accept or provide inputs to each other using some other mechanism.

Although a number of separate components are illustrated in FIG. 9, one or more of the components may be combined or commonly implemented. For example, the processor 904 may be used to implement not only the functionality described above with respect to the processor 904, but also to implement the functionality described above with respect to the signal detector 918, the DSP 920, the user interface 922, and/or the power control component 924. Further, each of the components illustrated in FIG. 9 may be implemented using a plurality of separate elements.

Figure 10A:
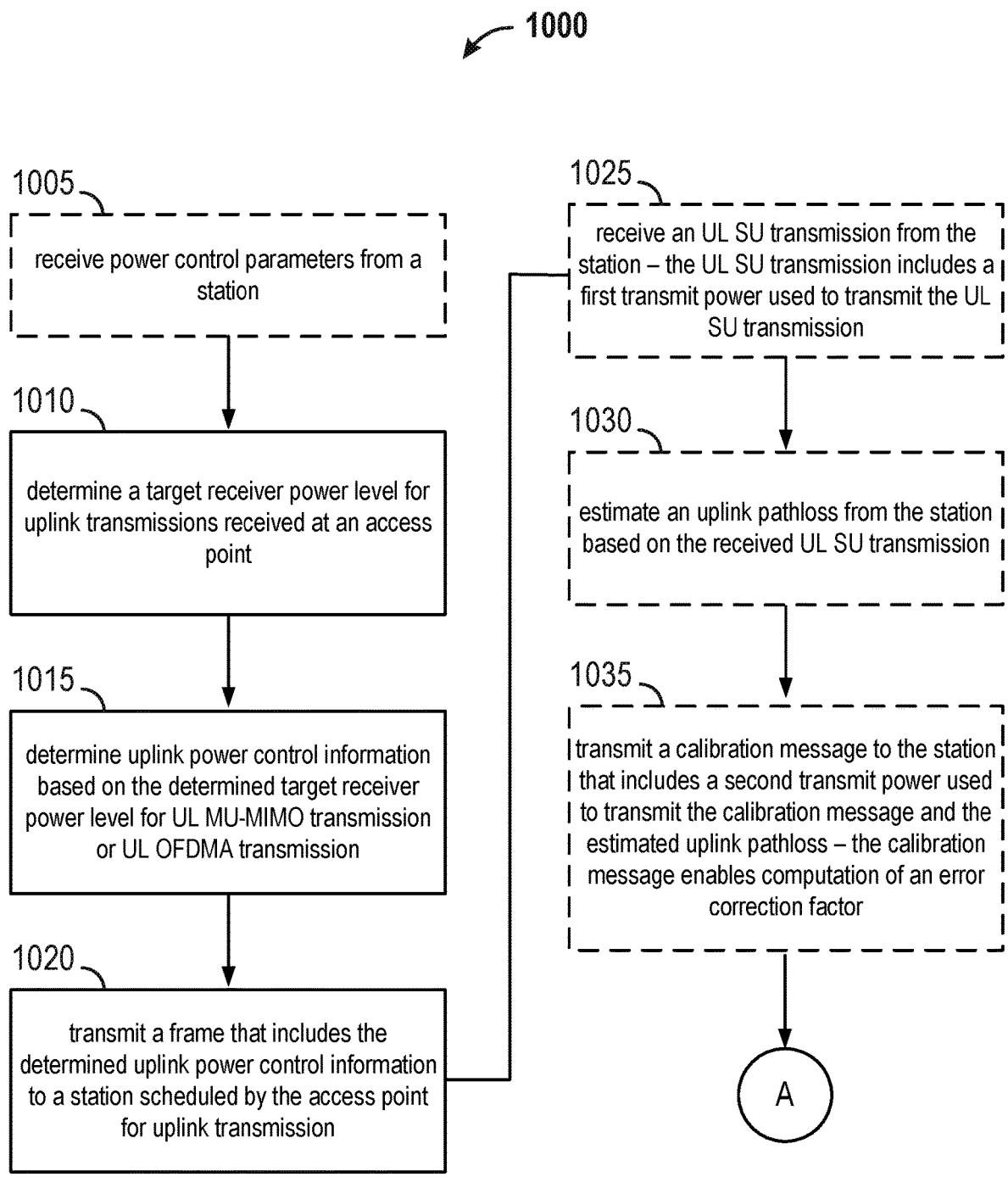
FIGS. 10A and 10B are flowcharts of example methods of wireless communication for power control by an access point.
Figure 10B:
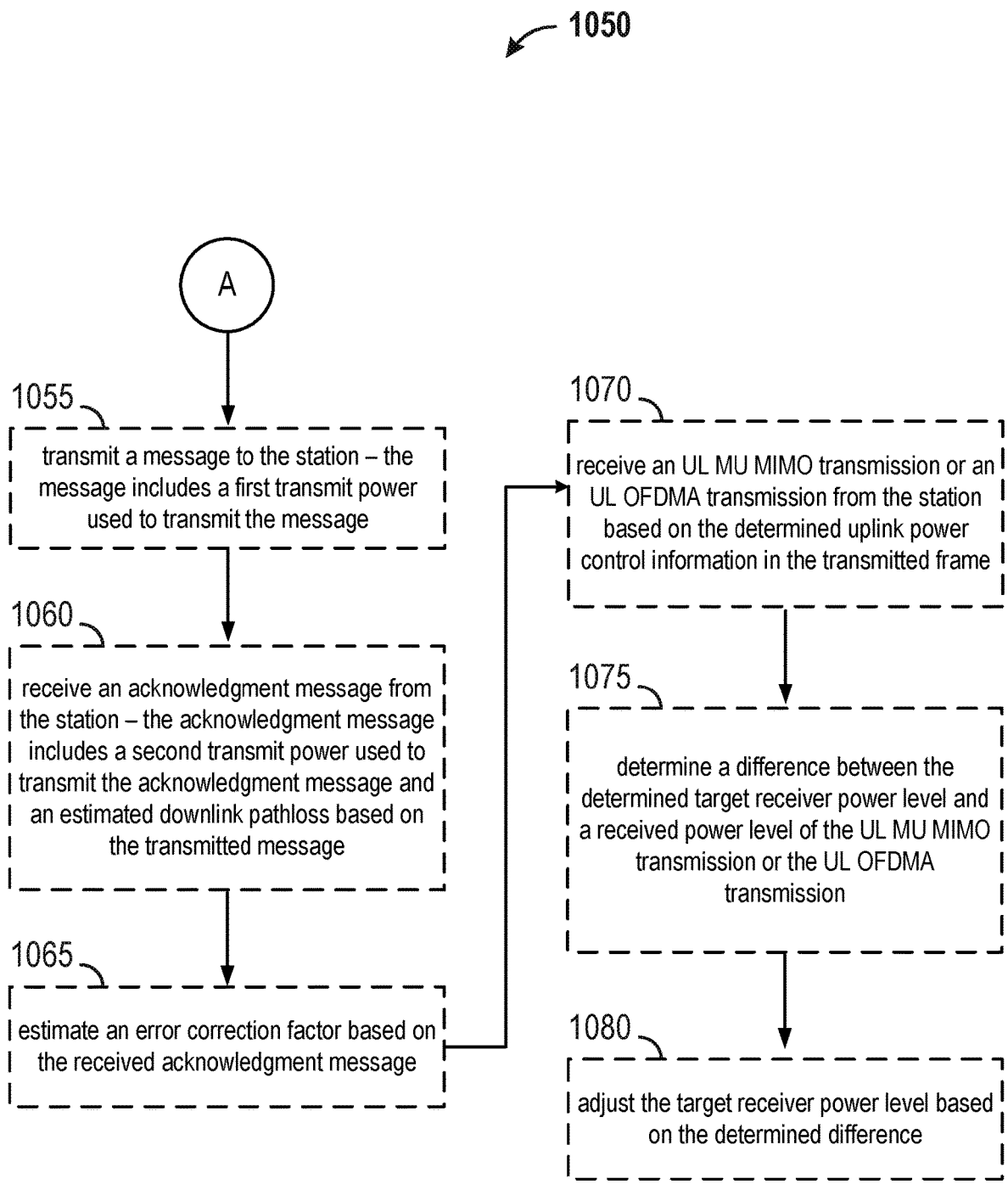

FIGS. 10A and 10B are flowcharts of example methods 1000, 1050 of wireless communication for power control by an access point. The methods 1000, 1050 may be performed using an apparatus (e.g., the AP 104, the AP 202, the AP 302, the AP 402, the AP 502, the AP 602, the AP 702, the AP 802, or the wireless device 902, for example). Although the methods 1000, 1050 are described below with respect to the elements of wireless device 902 of FIG. 9, other components may be used to implement one or more of the steps described herein. The dotted lines with respect to the various blocks represent optional blocks.

At block 1005, the apparatus may receive power control parameters from a station. For example, referring to FIG. 8, the apparatus may be the AP 802, and the station may be the STA 804. The AP 802 may receive power control parameters from the STA 804. The power control parameters may include at least one of a dynamic power range of the STA 804, an absolute transmit power accuracy of the STA 804, a relative transmit power accuracy of the STA 804, a transmit power step size of the STA 804, a maximum transmit power associated with one or more MCSs supported by the STA 804, a minimum transmit power associated with the one or more MCSs supported by the STA 804, a maximum transmit power associated with one or more RU sizes, or a minimum transmit power associated with one or more RU sizes.

At block 1010, the apparatus may determine a target receiver power level for uplink transmissions received at the apparatus. For example, referring to FIG. 8, the AP 802 may determine a target Rx power level for uplink transmissions received at the AP 802. In an example, the AP 802 may determine the target Rx power level by determining a number of STAs associated with the AP 802 and by determining the number of RUs and/or the RU size on which the STAs are scheduled for transmission to the AP 802. In an aspect, the determination may further be based on an uplink packet duration. In an aspect, the determination may also be based on the receiver implementation at the AP 802 such as inter-stream interference management and certain SNR targets for different MCSs. Based on the foregoing, the AP 802 may compute the target Rx power level for UL MU-MIMO or UL OFDMA transmissions.

At block 1015, the apparatus may determine uplink power control information based on the determined target receiver power level for UL MU-MIMO transmission or UL OFDMA transmission. For example, referring to FIG. 8, the AP 802 may determine uplink power control information based on the determined target Rx power level by determining the dynamic power range of the STAs scheduled for transmission, including the STA 804, and by determining the maximum transmit power level for one or more MCSs supported by the STAs. The AP 802 may compute the target RSSI at the AP 802 or compute the Tx power level at the STA 804 and/or other STAs.

At block 1020, the apparatus may transmit a frame that includes the determined uplink power control information to a station scheduled by the access point for uplink transmission. For example, referring to FIG. 8, the AP 802 may transmit the trigger frame 810 that includes the target RSSI to the STA 804. The trigger frame 810 may indicate the STA ID for the STA 804 and an allocated RU and/or RU size indication for the STA 804. The trigger frame 810 may also indicate an MCS to use for uplink transmission.

At block 1025, the apparatus may receive an UL SU transmission from the station. The UL SU transmission may include a first transmit power used to transmit the UL SU transmission. For example, referring to FIG. 8, the AP 802 may receive the SU UL transmission 806 from the STA 804. The SU UL transmission 806 may include the first transmit power used by the STA 804 to transmit the SU UL transmission 806.

At block 1030, the apparatus may estimate an uplink pathloss from the station based on the received UL SU transmission. For example, referring to FIG. 8, the AP 802 may estimate the uplink pathloss from the STA 804 based on the received SU UL transmission 806. The AP 802 may estimate the uplink pathloss by measuring the received power of the SU UL transmission 806 and by subtracting the measured received power from the first transmit power indicated by the SU UL transmission 806.

At block 1035, the apparatus may transmit a calibration message to the station that includes a second transmit power used to transmit the calibration message and the estimated uplink pathloss. The calibration message enables computation of an error correction factor. For example, referring to FIG. 8, the AP 802 may transmit the downlink frame 808 (the calibration message) to the STA 804. The downlink frame 808 includes a second transmit power used by the AP 802 to transmit the downlink frame 808 and the estimated uplink pathloss. The downlink frame 808 enables the STA 804 to compute a measurement error correction factor.

At block 1055, the apparatus may transmit a message to the station. The message may include a first transmit power used to transmit the message. For example, referring to FIG. 7, the apparatus may be the AP 702, and the station may be the STA 704. The AP 702 may transmit the downlink frame 706 to the STA 704. The downlink frame 706 may include a first transmit power used by the AP 702 to transmit the downlink frame 706.

At block 1060, the apparatus may receive an acknowledgment message from the station. The acknowledgment message may include a second transmit power used to transmit the acknowledgment message and an estimated downlink pathloss based on the transmitted message. For example, referring to FIG. 7, the AP 702 may receive the uplink frame 708 (the acknowledgment message) from the STA 704. The uplink frame 708 may include a second transmit power used by the STA 704 to transmit the uplink frame 708. The uplink frame 708 may include the estimated downlink pathloss calculated by the STA 704 based on the downlink frame 706.

At block 1065, the apparatus may estimate an error correction factor based on the received acknowledgment message. For example, referring to FIG. 7, the AP 702 may estimate the error correction factor based on the received uplink frame 708. The AP 702 may estimate the error correction factor by determining the uplink pathloss based on the received uplink frame 708 and by taking the difference between the estimated downlink pathloss and the determined uplink pathloss.

At block 1070, the apparatus may receive an UL MU MIMO transmission or an UL OFDMA transmission from the station based on the determined uplink power control information in the transmitted frame. For example, referring to FIG. 8, the AP 802 may receive an UL MU-MIMO transmission 812 from the STA 804 based on the determined uplink power control information in the trigger frame 810.

At block 1075, the apparatus may determine a difference between the determined target receiver power level and a received power level of the UL MU MIMO transmission or the UL OFDMA transmission. For example, referring to FIG. 8, the AP 802 may determine a difference between the determined target receiver power level and the received power level of the UL MU-MIMO transmission 812. The AP 802 may determine the difference by measuring the received power level of the UL MU-MIMO transmission 812 and by taking the difference between the determined target receiver power level and the received power level of the UL MU-MIMO transmission 812.

At block 1080, the apparatus may adjust the target receiver power level based on the determined difference. For example, referring to FIG. 8, the AP 802 may adjust the target receiver power level based on the determined difference. That is, the AP 802 may increase the target receiver power level based on the difference if the measured power level is less than the target receiver power level, or the AP 802 may decrease the target receiver power level if the measured power level is greater than the target receiver power level. In another aspect, the AP 802 may determine not to adjust the target receiver power level if the measured power level is within a threshold of the target receiver power level.

Figure 11:
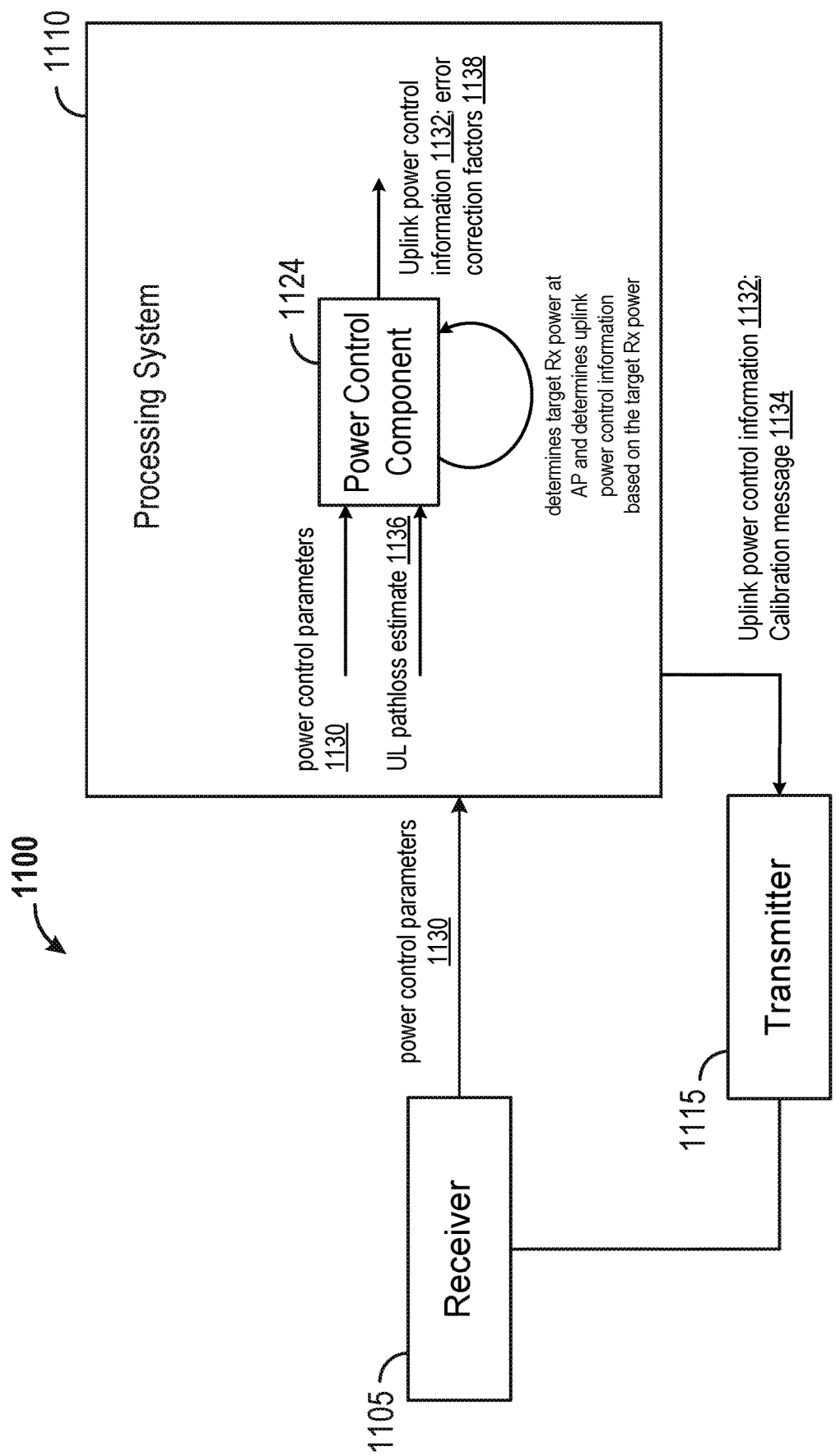
FIG. 11 is a functional block diagram of an example wireless communication device configured for power control.

FIG. 11 is a functional block diagram of an example wireless communication device 1100 configured for power control. The wireless communication device 1100 may include a receiver 1105, a processing system 1110, and a transmitter 1115. The processing system 1110 may include a power control component 1124. The processing system 1110 and/or the power control component 1124 may be configured to determine a target receiver power level for uplink transmissions received at the wireless communication device 1100. The processing system 1110 and/or the power control component 1124 may be configured to determine uplink power control information 1132 based on the determined target receiver power level for UL MU-MIMO transmission or UL OFDMA transmission. The transmitter 1115, processing system 1110, and/or the power control component 1124 may be configured to transmit a frame that includes the determined uplink power control information to a station scheduled by the wireless communication device 1100 for uplink transmission. In another configuration, the receiver 1105, processing system 1110, and/or the power control component 1124 may be configured to receive power control parameters 1130 from the station. The power control parameters 1130 may include at least one of a dynamic power range of the station, an absolute transmit power accuracy of the station, a relative transmit power accuracy of the station, a transmit power step size of the station, a maximum transmit power associated with one or more MCSs, a minimum transmit power associated with the one or more MCSs, or a maximum transmit power associated with one or more RU sizes, a minimum transmit power associated with one or more RU sizes. In an aspect, the uplink power control information may be determined based on the received power control parameters. In another aspect, the uplink power control information may be determined based on one or more of an MCS to be used by each scheduled station, an uplink pathloss of each scheduled station, a maximum transmit power for each scheduled station, a minimum transmit power for each scheduled station, a number of stations scheduled for uplink transmission on a same RU, a transmission history for each scheduled station, and an RU size. In another aspect, the determined uplink power control information controls uplink transmit power for a single station scheduled for transmission, for all stations scheduled for transmission, or for a subset stations scheduled for transmission. In another aspect, the determined uplink power control information may include the determined target receiver power level, a transmit power level, or a relative power level change from a previous transmission. In another aspect, the frame may further include a downlink transmit power for transmitting the frame, and the determined uplink power control information may include the determined target receiver power level. In another aspect, the determined uplink power control information may include a transmit power level based on a pathloss from the station to the wireless communication device 1100. In another aspect, the frame may be a trigger frame, and the determined uplink power control information is transmitted in the trigger frame. In another configuration, the receiver 1105, the processing system 1110 and/or the power control component 1124 may be configured to receive an UL SU transmission from the station. The UL SU transmission may include a first transmit power used to transmit the UL SU transmission. The processing system 1110 and/or the power control component 1124 may be configured to estimate an uplink pathloss from the station based on the received UL SU transmission and to transmit a calibration message 1134 to the station that includes a second transmit power used to transmit the calibration message 1134 and the estimated uplink pathloss. The calibration message 1134 may enable computation of an error correction factor. In another configuration, the transmitter 1115, the processing system 1110, and/or the power control component 1124 may be configured to transmit a message to the station. The message may include a first transmit power used to transmit the message. The receiver 1105, the processing system 1110, and/or the power control component 1124 may be configured to receive an acknowledgment message from the station. The acknowledgment message may include a second transmit power used to transmit the acknowledgment message and an estimated downlink pathloss based on the transmitted message. The processing system 1110 and/or the power control component 1124 may be configured to estimate an error correction factor based on the received acknowledgment message. In another configuration, the receiver 1105, the processing system 1110, and/or the power control component 1124 may be configured to receive an UL MU MIMO transmission or an UL OFDMA transmission from the station based on the determined uplink power control information in the transmitted frame. In yet another configuration, the processing system 1110 and/or the power control component 1124 may be configured to determine a difference between the determined target receiver power level and a received power level of the UL MU MIMO transmission or the UL OFDMA transmission. In this configuration, the processing system 1110 and/or the power control component 1124 may be configured to adjust the target receiver power level based on the determined difference.

The receiver 1105, the processing system 1110, the power control component 1124, and/or the transmitter 1115 may be configured to perform one or more functions discussed above with respect to blocks 1005, 1010, 1015, 1020, 1025, 1030, 1035, 1055, 1060, 1065, 1070, 1075, and 1080 of FIGS. 10A and 10B. The receiver 1105 may correspond to the receiver 912. The processing system 1110 may correspond to the processor 904. The transmitter 1115 may correspond to the transmitter 910. The power control component 1124 may correspond to the power control component 124 and/or the power control component 924.

In one configuration, the wireless communication device 1100 includes means for determining a target receiver power level for uplink transmissions received at the wireless communication device 1100. The uplink power control information may be determined based on the determined target receiver power level for UL MU-MIMO transmission or UL OFDMA transmission. The wireless communication device 1100 may include means for transmitting a frame that includes the determined uplink power control information to a station scheduled by the wireless communication device 1100 for uplink transmission. In another configuration, the wireless communication device 1100 may include means for receiving power control parameters from the station. The power control parameters may include at least one of a dynamic power range of the station, an absolute transmit power accuracy of the station, a relative transmit power accuracy of the station, a transmit power step size of the station, a maximum transmit power associated with one or more MCSs, a minimum transmit power associated with the one or more MCSs, or a maximum transmit power associated with one or more RU sizes, a minimum transmit power associated with one or more RU sizes. In an aspect, the uplink power control information may be determined based on the received power control parameters. In another aspect, the uplink power control information may be determined based on one or more of an MCS to be used by each scheduled station, an uplink pathloss of each scheduled station, a maximum transmit power for each scheduled station, a minimum transmit power for each scheduled station, a number of stations scheduled for uplink transmission on a same RU, a transmission history for each scheduled station, and an RU size. In another aspect, the determined uplink power control information controls uplink transmit power for a single station scheduled for transmission, for all stations scheduled for transmission, or for a subset stations scheduled for transmission. In another aspect, the determined uplink power control information may include the determined target receiver power level, a transmit power level, or a relative power level change from a previous transmission. In another aspect, the frame may further include a downlink transmit power for transmitting the frame, and the determined uplink power control information may include the determined target receiver power level. In another aspect, the determined uplink power control information may include a transmit power level based on a pathloss from the station to wireless communication device 1100. In another aspect, the frame may be a trigger frame, and the determined uplink power control information is transmitted in the trigger frame. In another configuration, the wireless communication device 1100 may include means for receiving an UL SU transmission from the station. The UL SU transmission may include a first transmit power used to transmit the UL SU transmission. The wireless communication device 1100 may include means for estimating an uplink pathloss from the station based on the received UL SU transmission and to transmit a calibration message to the station that includes a second transmit power used to transmit the calibration message and the estimated uplink pathloss. The calibration message may enable computation of an error correction factor. In another configuration, the wireless communication device 1100 may include means for transmitting a message to the station. The message may include a first transmit power used to transmit the message. The wireless communication device 1100 may include means for receiving an acknowledgment message from the station. The acknowledgment message may include a second transmit power used to transmit the acknowledgment message and an estimated downlink pathloss based on the transmitted message. The wireless communication device 1100 may include means for estimating an error correction factor based on the received acknowledgment message. In another configuration, the wireless communication device 1100 may include means for receiving an UL MU MIMO transmission or an UL OFDMA transmission from the station based on the determined uplink power control information in the transmitted frame. In yet another configuration, the wireless communication device 1100 may include means for determining a difference between the determined target receiver power level and a received power level of the UL MU MIMO transmission or the UL OFDMA transmission. In this configuration, the target receiver power level may be adjusted based on the determined difference.

For example, means for determining a target receiver power level may include the processing system 1110 and/or the power control component 1124. Means for determining uplink power control information may include the processing system 1110 and/or the power control component 1124. Means for transmitting the frame may include the transmitter 1115, processing system 1110, and/or the power control component 1124. Means for receiving an uplink SU transmission may include the receiver 1105, the processing system 1110, and/or the power control component 1124. Means for estimating the uplink pathloss may include the processing system 1110 and/or the power control component 1124. Means for transmitting a calibration message may include the transmitter 1115, the processing system 1110, and/or the power control component 1124. Means for transmitting a message to the station may include the transmitter 1115, the processing system 1110, and/or the power control component 1124. Means for receiving an acknowledgment message from the station may include the receiver 1105, the processing system 1110, and/or the power control component 1124. Means for estimating an error correction factor may include the processing system 1110 and/or the power control component 1124. Means for receiving an UL MU MIMO transmission or an UL OFDMA transmission may include the receiver 1105, the processing system 1110, and/or the power control component 1124. Means for determining a difference may include the processing system 1110 and/or the power control component 1124. Means for adjusting the target receiver power level may include the processing system 1110 and/or the power control component 1124.

Figure 12:
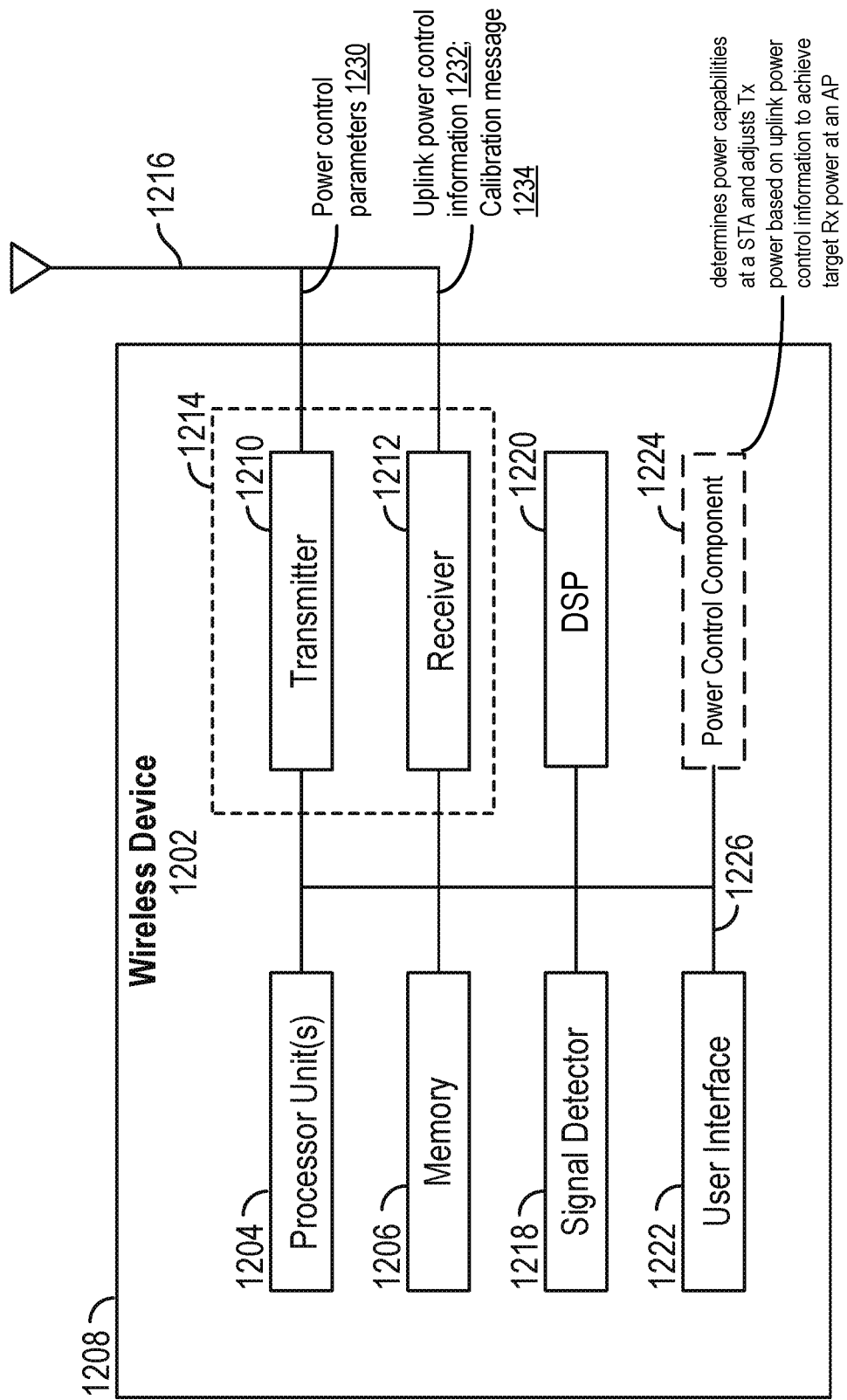
FIG. 12 shows an example functional block diagram of a wireless device that may be employed within the wireless communication system of FIG. 1.

FIG. 12 shows an example functional block diagram of a wireless device 1202 that may be employed within the wireless communication system 100 of FIG. 1. The wireless device 1202 is an example of a device that may be configured to implement the various methods described herein. For example, the wireless device 1202 may comprise the STA 114.

The wireless device 1202 may include a processor 1204 which controls operation of the wireless device 1202. The processor 1204 may also be referred to as a CPU. Memory 1206, which may include both ROM and RAM, may provide instructions and data to the processor 1204. A portion of the memory 1206 may also include NVRAM. The processor 1204 typically performs logical and arithmetic operations based on program instructions stored within the memory 1206. The instructions in the memory 1206 may be executable (by the processor 1204, for example) to implement the methods described herein.

The processor 1204 may comprise or be a component of a processing system implemented with one or more processors. The one or more processors may be implemented with any combination of general-purpose microprocessors, microcontrollers, DSPs, FPGAs, PLDs, controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 1202 may also include a housing 1208, and the wireless device 1202 may include a transmitter 1210 and/or a receiver 1212 to allow transmission and reception of data between the wireless device 1202 and a remote device. The transmitter 1210 and the receiver 1212 may be combined into a transceiver 1214. An antenna 1216 may be attached to the housing 1208 and electrically coupled to the transceiver 1214. The wireless device 1202 may also include multiple transmitters, multiple receivers, multiple transceivers, and/or multiple antennas.

The wireless device 1202 may also include a signal detector 1218 that may be used to detect and quantify the level of signals received by the transceiver 1214 or the receiver 1212. The signal detector 1218 may detect such signals as total energy, energy per subcarrier per symbol, power spectral density, and other signals. The wireless device 1202 may also include a DSP 1220 for use in processing signals. The DSP 1220 may be configured to generate a packet for transmission. In some aspects, the packet may comprise a PPDU.

The wireless device 1202 may further comprise a user interface 1222 in some aspects. The user interface 1222 may comprise a keypad, a microphone, a speaker, and/or a display. The user interface 1222 may include any element or component that conveys information to a user of the wireless device 1202 and/or receives input from the user.

When the wireless device 1202 is implemented as a station (e.g., STA 114), the wireless device 1202 may also comprise a power control component 1224. The power control component 1224 may be configured to receive a frame from an access point. The frame may include uplink power control information 1232, associated with a target receiver power level at the access point, for UL MU-MIMO transmission or UL OFDMA transmission. The power control component 1224 may be configured to determine a transmit power based on the received uplink power control information and to transmit a second frame to the access point based on the determined transmit power. In another configuration, the power control component 1224 may be configured to transmit power control parameters 1230 to the access point. The power control parameters may include at least one of a dynamic power range of the station, an absolute transmit power accuracy of the station, a relative transmit power accuracy of the station, a transmit power step size of the station, a maximum transmit power associated with one or more MCSs, a minimum transmit power associated with the one or more MCSs, a maximum transmit power associated with one or more RU sizes, or a minimum transmit power associated with one or more RU sizes. The received uplink power control information may be based on the transmitted power control parameters. In an aspect, the determined uplink power control information may include the determined target receiver power level, a transmit power level, or a relative power level change from a previous transmission. In another aspect, the frame may further include a downlink transmit power used to transmit the frame, and the determined uplink power control information may include the determined target receiver power level. In another aspect, the frame may be a trigger frame, and the determined uplink power control information may be received in the trigger frame. In another aspect, the power control component 1224 may be configured to determine the transmit power by determining a pathloss between the wireless device 1202 and the access point based on a downlink transmit power indicated in the received frame and to compute the transmit power based on the determined pathloss and the uplink power control information. In another aspect, the determined uplink power control information may include a transmit power level based on a pathloss from the wireless device 1202 to the access point. The transmit power may be equal to the transmit power level. In another aspect, the determined uplink power control information may include a relative power change from the previous transmission by the wireless device 1202, and the transmit power may be adjusted based on the relative power change. In another configuration, the power control component 1224 may be configured to transmit an UL SU transmission to the access point. The UL SU transmission may include a first transmit power used to transmit the UL SU transmission. The power control component 1224 may be configured to receive a calibration message 1234 from the access point that includes a second transmit power used to transmit the calibration message 1234 and an estimated uplink pathloss based on the transmitted UL SU transmission. The power control component 1224 may be configured to compute an error correction factor based on the received calibration message 1234. In another configuration, the power control component 1224 may be configured to receive a message from the access point. The message may include a first transmit power used to transmit the message. The power control component 1224 may be configured to transmit an acknowledgment message to the access point. The acknowledgment message may include a second transmit power used to transmit the acknowledgment message and an estimated downlink pathloss based on the transmitted message.

The various components of the wireless device 1202 may be coupled together by a bus system 1226. The bus system 1226 may include a data bus, for example, as well as a power bus, a control signal bus, and a status signal bus in addition to the data bus. Components of the wireless device 1202 may be coupled together or accept or provide inputs to each other using some other mechanism.

Although a number of separate components are illustrated in FIG. 12, one or more of the components may be combined or commonly implemented. For example, the processor 1204 may be used to implement not only the functionality described above with respect to the processor 1204, but also to implement the functionality described above with respect to the signal detector 1218, the DSP 1220, the user interface 1222, and/or the power control component 1224. Further, each of the components illustrated in FIG. 12 may be implemented using a plurality of separate elements.

Figure 13:
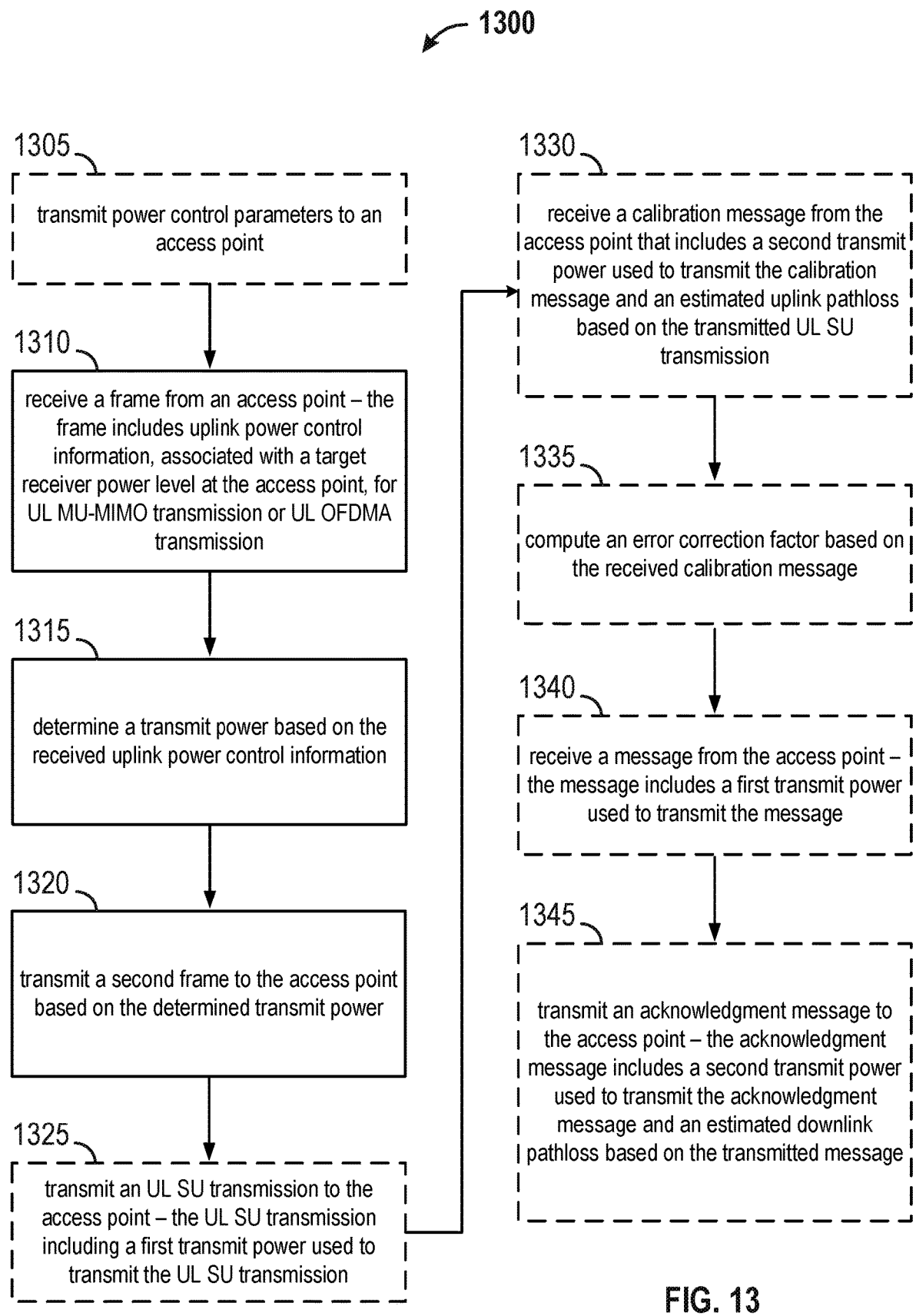
FIG. 13 is a flowchart of an example method of wireless communication for power control by a station.

FIG. 13 is a flowchart of an example method 1300 of wireless communication for power control by a station. The method 1300 may be performed using an apparatus (e.g., the STA 114, the STA 204, the STA 304, the STA 404, the STA 504, the STA 604, the STA 704, the STA 804, or the wireless device 1202, for example). Although the method 1300 is described below with respect to the elements of wireless device 1202 of FIG. 12, other components may be used to implement one or more of the steps described herein. The dotted lines with respect to the various blocks represent optional blocks.

At block 1305, the apparatus may transmit power control parameters to an access point. For example, referring to FIG. 8, the apparatus may be a STA 804 and the access point may be the AP 802. The STA 804 may transmit power control parameters to the AP 802. The power control parameters may include at least one of a dynamic power range of the STA 804, an absolute transmit power accuracy of the STA 804, a relative transmit power accuracy of the STA 804, a transmit power step size of the STA 804, a maximum transmit power associated with one or more MCSs, a minimum transmit power associated with the one or more MCSs, a maximum transmit power associated with one or more RU sizes, or a minimum transmit power associated with one or more RU sizes.

At block 1310, the apparatus may receive a frame from the access point. The frame may include uplink power control information, associated with a target receiver power level at the access point, for UL MU-MIMO transmission or UL OFDMA transmission. For example, referring to FIG. 8, the STA 804 may receive the trigger frame 810 (the frame) from the AP 802. The trigger frame 810 may include uplink power control information, associated with the target receiver power level at the AP 802, for UL MU-MIMO transmission or UL OFDMA transmission.

At block 1315, the apparatus may determine a transmit power based on the received uplink power control information. For example, referring to FIG. 8, the STA 804 may determine the transmit power based on the received uplink power control information. In one aspect, if the uplink power control information contains the transmit power level, then the STA 804 may determine the transmit power by using the transmit power level indicated by the uplink power control information. In another aspect, if the uplink power control information contains a target receiver power level, then the STA 804 may determine the pathloss between the STA 804 and the AP 802 and add the pathloss to the target receiver power level, in which the sum may be the transmit power. In another aspect, if the uplink power control information contains a relative power level change, then the STA 804 may adjust the previous transmit power based on the relative power level change.

At block 1320, the apparatus may transmit a second frame to the access point based on the determined transmit power. For example, referring to FIG. 8, the STA 804 may transmit a second frame to the AP 802 based on the determined transmit power.

At block 1325, the apparatus may transmit an UL SU transmission to the access point. The UL SU transmission may include a first transmit power used to transmit the UL SU transmission. For example, referring to FIG. 8, the STA 804 may transmit the SU UL transmission 806 to the AP 802. The SU UL transmission 806 may include a first transmit power used by the STA 804 to transmit the SU UL transmission 806.

At block 1330, the apparatus may receive a calibration message from the access point that includes a second transmit power used to transmit the calibration message and an estimated uplink pathloss based on the transmitted UL SU transmission. For example, referring to FIG. 8, the STA 804 may receive the downlink frame 808 (the calibration message) from the AP 802 that includes a second transmit power used by the AP 802 to transmit the downlink frame 808. The downlink frame 808 may also include an estimated uplink pathloss based on the SU UL transmission 806.

At block 1335, the apparatus may compute an error correction factor based on the received calibration message. For example, referring to FIG. 8, the STA 804 may compute an error correction factor based on the received downlink frame 808. The STA 804 may compute the error correction factor by determining the downlink pathloss from the AP 802 based on the downlink frame 808. The STA 804 may determine the difference between the downlink pathloss and the uplink pathloss received in the downlink frame 808, in which the difference between the pathlosses may be considered the error correction factor.

At block 1340, the apparatus may receive a message from the access point. The message may include a first transmit power used to transmit the message. For example, referring to FIG. 7, the apparatus may be the STA 704 and the access point may be the AP 702. The STA 704 may receive the downlink frame 706 (the message) from the AP 702. The downlink frame 706 may include a first transmit power used by the AP 702 to transmit the downlink frame 706.

At block 1345, the apparatus may transmit an acknowledgment message to the access point. The acknowledgment message may include a second transmit power used to transmit the acknowledgment message and an estimated downlink pathloss based on the transmitted message. For example, referring to FIG. 7, the STA 704 may transmit the uplink frame 708 to the AP 702. The uplink frame 708 may include a second transmit power used by the STA 704 to transmit the uplink frame 708. The uplink frame 708 may further include an estimated downlink pathloss based on the downlink frame 706.

Figure 14:
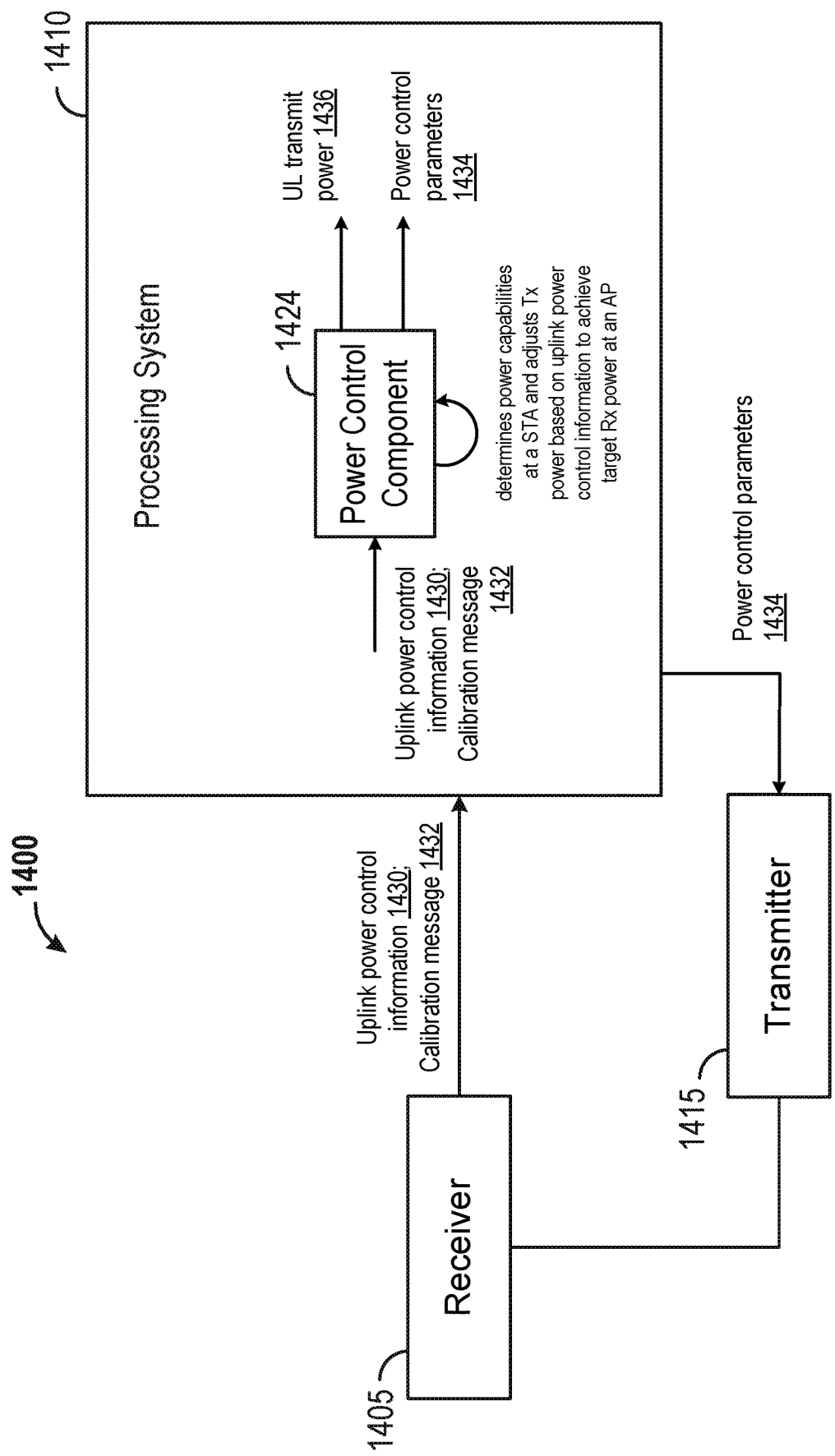
FIG. 14 is a functional block diagram of an example wireless communication device configured for power control.

FIG. 14 is a functional block diagram of an example wireless communication device 1400 configured for power control. The wireless communication device 1400 may include a receiver 1405, a processing system 1410, and a transmitter 1415. The processing system 1410 may include a power control component 1424. The receiver 1405, the processing system 1410, and/or the power control component 1424 may be configured to receive a frame from an access point. The frame may include uplink power control information 1430, associated with a target receiver power level at the access point, for UL MU-MIMO transmission or UL OFDMA transmission. The processing system 1410 and/or the power control component 1424 may be configured to determine a transmit power based on the received uplink power control information and to transmit a second frame to the access point based on the determined transmit power. In another configuration, the transmitter 1415, the processing system 1410, and/or the power control component 1424 may be configured to transmit power control parameters 1434 to the access point. The power control parameters may include at least one of a dynamic power range of the wireless communication device 1400, an absolute transmit power accuracy of the wireless communication device 1400, a relative transmit power accuracy of the wireless communication device 1400, a transmit power step size of the wireless communication device 1400, a maximum transmit power associated with one or more MCSs, a minimum transmit power associated with the one or more MCSs, a maximum transmit power associated with one or more RU sizes, or a minimum transmit power associated with one or more RU sizes. The received uplink power control information may be based on the transmitted power control parameters. In an aspect, the determined uplink power control information may include the determined target receiver power level, a transmit power level, or a relative power level change from a previous transmission. In another aspect, the frame may further include a downlink transmit power used to transmit the frame, and the determined uplink power control information may include the determined target receiver power level. In another aspect, the frame may be a trigger frame, and the determined uplink power control information may be received in the trigger frame. In another aspect, the processing system 1410 and/or the power control component 1424 may be configured to determine the transmit power by determining a pathloss between the wireless communication device 1400 and the access point based on a downlink transmit power indicated in the received frame and to compute the transmit power based on the determined pathloss and the uplink power control information. In another aspect, the determined uplink power control information may include a transmit power level based on a pathloss from the wireless communication device 1400 to the access point. The transmit power may be equal to the transmit power level. In another aspect, the determined uplink power control information may include a relative power change from the previous transmission by the wireless communication device 1400, and the transmit power may be adjusted based on the relative power change. In another configuration, the transmitter 1415, the processing system 1410, and/or the power control component 1424 may be configured to transmit an UL SU transmission to the access point. The UL SU transmission may include a first transmit power used to transmit the UL SU transmission. The receiver 1405, the processing system 1410, and/or the power control component 1424 may be configured to receive a calibration message 1432 from the access point that includes a second transmit power used to transmit the calibration message 1432 and an estimated uplink pathloss based on the transmitted UL SU transmission. The processing system 1410 and/or the power control component 1424 may be configured to compute an error correction factor based on the received calibration message 1432. In another configuration, receiver 1405, the processing system 1410, and/or the power control component 1424 may be configured to receive a message from the access point. The message may include a first transmit power used to transmit the message. The transmitter 1415, the processing system 1410, and/or the power control component 1424 may be configured to transmit an acknowledgment message to the access point. The acknowledgment message may include a second transmit power used to transmit the acknowledgment message and an estimated downlink pathloss based on the transmitted message.

The receiver 1405, the processing system 1410, the power control component 1424, and/or the transmitter 1415 may be configured to perform one or more functions discussed above with respect to blocks 1305, 1310, 1315, 1320, 1325, 1330, 1335, 1340, and 1345 of FIG. 13. The receiver 1405 may correspond to the receiver 1212. The processing system 1410 may correspond to the processor 1204. The transmitter 1415 may correspond to the transmitter 1210. The power control component 1424 may correspond to the power control component 126 and/or the power control component 1224.

In one configuration, the wireless communication device 1400 may include means for receiving a frame from an access point. The frame may include uplink power control information, associated with a target receiver power level at the access point, for UL MU-MIMO transmission or UL OFDMA transmission. The wireless communication device 1400 may include means for determining a transmit power based on the received uplink power control information and means for transmitting a second frame to the access point based on the determined transmit power. In another configuration, the wireless communication device 1400 may include means for transmitting power control parameters to the access point. The power control parameters may include at least one of a dynamic power range of the wireless communication device 1400, an absolute transmit power accuracy of the wireless communication device 1400, a relative transmit power accuracy of the wireless communication device 1400, a transmit power step size of the wireless communication device 1400, a maximum transmit power associated with one or more MCSs, a minimum transmit power associated with the one or more MCSs, a maximum transmit power associated with one or more RU sizes, or a minimum transmit power associated with one or more RU sizes. The received uplink power control information may be based on the transmitted power control parameters. In an aspect, the determined uplink power control information may include the determined target receiver power level, a transmit power level, or a relative power level change from a previous transmission. In another aspect, the frame may further include a downlink transmit power used to transmit the frame, and the determined uplink power control information may include the determined target receiver power level. In another aspect, the frame may be a trigger frame, and the determined uplink power control information may be received in the trigger frame. In another aspect, means for determining the transmit power may be configured to determine a pathloss between the wireless communication device 1400 and the access point based on a downlink transmit power indicated in the received frame and to compute the transmit power based on the determined pathloss and the uplink power control information. In another aspect, the determined uplink power control information may include a transmit power level based on a pathloss from the wireless communication device 1400 to the access point. The transmit power may be equal to the transmit power level. In another aspect, the determined uplink power control information may include a relative power change from the previous transmission by the wireless communication device 1400, and the transmit power may be adjusted based on the relative power change. In another configuration, the wireless communication device 1400 may include means for transmitting an UL SU transmission to the access point. The UL SU transmission may include a first transmit power used to transmit the UL SU transmission. The wireless communication device 1400 may include means for receiving a calibration message from the access point that includes a second transmit power used to transmit the calibration message and an estimated uplink pathloss based on the transmitted UL SU transmission. The wireless communication device 1400 may include means for computing an error correction factor based on the received calibration message. In another configuration, the wireless communication device 1400 may include means for receiving a message from the access point. The message may include a first transmit power used to transmit the message. The wireless communication device 1400 may include means for transmitting an acknowledgment message to the access point. The acknowledgment message may include a second transmit power used to transmit the acknowledgment message and an estimated downlink pathloss based on the transmitted message.

For example, means for receiving a frame may include the receiver 1405, the processing system 1410, and/or the power control component 1424. Means for determining a transmit power may include the processing system 1410 and/or the power control component 1424. Means for transmitting a second frame may include the transmitter 1415, the processing system 1410, and/or the power control component 1424. Means for transmitting power control parameters may include the transmitter 1415, the processing system 1410, and/or the power control component 1424. Means for transmitting an UL SU transmission may include the transmitter 1415, the processing system 1410, and/or the power control component 1424. Means for receiving a calibration message may include the receiver 1405, the processing system 1410, and/or the power control component 1424. Means for computing an error correction factor may include the processing system 1410 and/or the power control component 1424. Means for receiving a message from the access point may include the receiver 1405, the processing system 1410, and/or the power control component 1424. Means for transmitting an acknowledgment message may include the transmitter 1415, the processing system 1410, and/or the power control component 1424.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, components and circuits described in connection with the present disclosure may be implemented or performed with a general purpose processor, a DSP, an application specific integrated circuit (ASIC), an FPGA or other PLD, discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, compact disk (CD)-ROM (CD-ROM) or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes CD, laser disc, optical disc, digital versatile disc (DVD), floppy disk and Blu-ray disc where disks usually reproduce data magnetically, while discs reproduce data optically with lasers. Thus, computer readable medium comprises a non-transitory computer readable medium (e.g., tangible media).

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Further, it should be appreciated that components and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for."

What is claimed is:

1. A method of wireless communication by an access point, comprising:
    receiving power control parameters of a station at the access point from the station, the power control parameters of the station indicating power control capabilities of the station, wherein the power control parameters of the station comprise at least one of a dynamic power range of the station, a transmit power step size of the station, a maximum transmit power associated with one or more resource unit (RU) sizes, a minimum transmit power associated with one or more RU sizes, or a transmit power headroom of the station;
    determining a target receiver power level for uplink transmissions transmitted by the station to be received at the access point;
    determining uplink power control information for the station based on the power control capabilities of the station and the determined target receiver power level for uplink multi-user multiple-input-multiple-output (UL MU-MIMO) transmission by the station or uplink orthogonal frequency-division multiple access (UL OFDMA) transmission by the station, the uplink power control information comprising the target receiver power level to be received at the access point; and
    transmitting a frame from the access point to the station that includes the determined uplink power control information and a downlink transmit power used for transmitting the frame from the access point to the station scheduled by the access point for uplink transmission.

2. The method of claim 1, wherein the power control parameters comprise at least one of an absolute transmit power accuracy of the station, a relative transmit power accuracy of the station, a maximum transmit power associated with one or more modulation and coding schemes (MCSs), or a minimum transmit power associated with the one or more MCSs.

3. The method of claim 1, wherein the uplink power control information is determined based on one or more of an MCS to be used by each scheduled station, an uplink pathloss of each scheduled station, a maximum transmit power for each scheduled station, a minimum transmit power for each scheduled station, a number of stations scheduled for uplink transmission on a same resource unit (RU), a transmission history for each scheduled station, and an RU size.

4. The method of claim 1, wherein the determined uplink power control information comprises the determined target receiver power level, a transmit power level, or a relative power level change from a previous transmission.

5. The method of claim 1, further comprising:
    receiving an uplink single-user (UL SU) transmission from the station, the UL SU transmission includes a first transmit power used to transmit the UL SU transmission;
    estimating an uplink pathloss from the station based on the received UL SU transmission; and
    transmitting a calibration message to the station that includes a second transmit power used to transmit the calibration message and the estimated uplink pathloss, wherein the calibration message enables computation of an error correction factor.

6. The method of claim 1, further comprising:
   transmitting a message to the station, the message including a first transmit power used to transmit the message;
   receiving an acknowledgment message from the station, the acknowledgment message including a second transmit power used to transmit the acknowledgment message and an estimated downlink pathloss based on the transmitted message; and
   estimating an error correction factor based on the received acknowledgment message.

7. The method of claim 1, further comprising receiving an UL MU MIMO transmission or an UL OFDMA transmission from the station based on the determined uplink power control information in the transmitted frame.

8. The method of claim 7, further comprising:
   determining a difference between the determined target receiver power level and a received power level of the UL MU MIMO transmission or the UL OFDMA transmission; and
   adjusting the target receiver power level based on the determined difference.

9. An access point for wireless communication, comprising:
   means for receiving power control parameters of a station at the access point from the station, the power control parameters of the station indicating power control capabilities of the station, wherein the power control parameters of the station comprise at least one of a dynamic power range of the station, a transmit power step size of the station, a maximum transmit power associated with one or more resource unit (RU) sizes, a minimum transmit power associated with one or more RU sizes, or a transmit power headroom of the station;
   means for determining a target receiver power level for uplink transmissions transmitted by the station to be received at the access point;
   means for determining uplink power control information for the station based on the power control capabilities of the station and the determined target receiver power level for uplink multi-user multiple-input-multiple-output (UL MU-MIMO) transmission by the station or uplink orthogonal frequency-division multiple access (UL OFDMA) transmission by the station, the uplink power control information comprising the target receiver power level to be received at the access point; and
   means for transmitting a frame from the access point to the station that includes the determined uplink power control information and a downlink transmit power used for transmitting the frame from the access point to the station scheduled by the access point for uplink transmission.

10. An access point for wireless communication, comprising:
    a memory; and
    at least one processor coupled to the memory and configured to:
       receive power control parameters of a station at the access point from the station, the power control parameters of the station indicating power control capabilities of the station, wherein the power control parameters of the station comprise at least one of a dynamic power range of the station, a transmit power step size of the station, a maximum transmit power associated with one or more resource unit (RU) sizes, a minimum transmit power associated with one or more RU sizes, or a transmit power headroom of the station;
       determine a target receiver power level for uplink transmissions transmitted by the station to be received at the access point;
       determine uplink power control information for the station based on the power control capabilities of the station and the determined target receiver power level for uplink multi-user multiple-input-multiple-output (UL MU-MIMO) transmission by the station or uplink orthogonal frequency-division multiple access (UL OFDMA) transmission by the station, the uplink power control information comprising the target receiver power level to be received at the access point; and
       transmit a frame from the access point to the station that includes the determined uplink power control information and a downlink transmit power used for transmitting the frame from the access point to the station scheduled by the access point for uplink transmission.

11. The access point of claim 10, wherein the power control parameters comprise at least one of an absolute transmit power accuracy of the station, a relative transmit power accuracy of the station, a maximum transmit power associated with one or more modulation and coding schemes (MCSs), or a minimum transmit power associated with the one or more MCSs.

12. The access point of claim 10, wherein the uplink power control information is determined based on one or more of an MCS to be used by each scheduled station, an uplink pathloss of each scheduled station, a maximum transmit power for each scheduled station, a minimum transmit power for each scheduled station, a number of stations scheduled for uplink transmission on a same resource unit (RU), a transmission history for each scheduled station, and an RU size.

13. The access point of claim 10, wherein the determined uplink power control information controls uplink transmit power for a single station scheduled for transmission, for all stations scheduled for transmission, or for a subset stations scheduled for transmission.

14. The access point of claim 10, wherein the determined uplink power control information comprises the determined target receiver power level, a transmit power level, or a relative power level change from a previous transmission.

15. The access point of claim 10, wherein the at least one processor is further configured to:
    receive an uplink single-user (UL SU) transmission from the station, the UL SU transmission includes a first transmit power used to transmit the UL SU transmission;
    estimate an uplink pathloss from the station based on the received UL SU transmission; and
    transmit a calibration message to the station that includes a second transmit power used to transmit the calibration message and the estimated uplink pathloss, wherein the calibration message enables computation of an error correction factor.

16. The access point of claim 10, wherein the at least one processor is further configured to:
    transmit a message to the station, the message including a first transmit power used to transmit the message;
    receive an acknowledgment message from the station, the acknowledgment message including a second transmit power used to transmit the acknowledgment message and an estimated downlink pathloss based on the transmitted message; and estimate an error correction factor based on the received acknowledgment message.

17. The access point of claim 10, wherein the at least one processor is further configured to receive an UL MU MIMO transmission or an UL OFDMA transmission from the station based on the determined uplink power control information in the transmitted frame.

18. The access point of claim 17, wherein the at least one processor is further configured to:

determine a difference between the determined target receiver power level and a received power level of the UL MU MIMO transmission or the UL OFDMA transmission; and adjust the target receiver power level based on the determined difference.

19. The access point of claim 10, wherein the at least one processor is further configured to:

receive an uplink single-user (UL SU) transmission from the station, the UL SU transmission includes a first transmit power used to transmit the UL SU transmission or a second transmit power relative to a maximum transmit power of the station; and estimate an uplink pathloss from the station based on the received UL SU transmission.

20. A non-transitory computer-readable medium of an access point storing executable code that, when executed, causes the access point to:

receive power control parameters of a station at the access point from the station, the power control parameters of the station indicating power control capabilities of the station, wherein the power control parameters of the station comprise at least one of a dynamic power range of the station, a transmit power step size of the station, a maximum transmit power associated with one or more resource unit (RU) sizes, a minimum transmit power associated with one or more RU sizes, or a transmit power headroom of the station;

determine a target receiver power level for uplink transmissions transmitted by the station to be received at the access point;

determine uplink power control information for the station based on the power control capabilities of the station and the determined target receiver power level for uplink multi-user multiple-input-multiple-output (UL MU-MIMO) transmission by the station or uplink orthogonal frequency-division multiple access (UL OFDMA) transmission by the station, the uplink power control information comprising the target receiver power level to be received at the access point; and transmit a frame from the access point to the station that includes the determined uplink power control information and a downlink transmit power used for transmitting the frame from the access point to the station scheduled by the access point for uplink transmission.

\* \* \* \* \*